(12) United States Patent
Ross et al.

(10) Patent No.: US 10,895,882 B2
(45) Date of Patent: Jan. 19, 2021

(54) CONTROLLING LOAD TRANSPORTING DEVICES

(71) Applicant: Entro Industries, Inc., Hillsboro, OR (US)

(72) Inventors: Jason Ross, Hillsboro, OR (US); Brian Unger, Hillsboro, OR (US); Shawn Smith, Hillsboro, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 350 days.

(21) Appl. No.: 15/908,699

(22) Filed: Feb. 28, 2018

(65) Prior Publication Data

US 2019/0041879 A1    Feb. 7, 2019

Related U.S. Application Data

(63) Continuation-in-part of application No. 15/807,176, filed on Nov. 8, 2017, now Pat. No. 10,793,409, and
(Continued)

(51) Int. Cl.
| | |
|---|---|
| *G05D 13/62* | (2006.01) |
| *B62D 57/032* | (2006.01) |
| *B66F 19/00* | (2006.01) |
| *B66F 7/20* | (2006.01) |
| *G05B 19/19* | (2006.01) |
| *G05B 19/416* | (2006.01) |

(Continued)

(52) U.S. Cl.
CPC ........... *G05D 13/62* (2013.01); *B62D 57/032* (2013.01); *B66F 7/20* (2013.01); *B66F 19/00* (2013.01); *G05B 19/19* (2013.01); *G05B 19/416* (2013.01); *B66F 3/46* (2013.01); *B66F 2700/09* (2013.01); *E21B 15/003* (2013.01)

(58) Field of Classification Search
None
See application file for complete search history.

(56) References Cited

U.S. PATENT DOCUMENTS

| | | | |
|---|---|---|---|
| 1,001,299 | A | 8/1911 | Page |
| 1,242,635 | A | 10/1917 | Anderson |

(Continued)

FOREIGN PATENT DOCUMENTS

| | | |
|---|---|---|
| CA | 2871406 | 11/2014 |
| CA | 2798743 | 8/2015 |

(Continued)

OTHER PUBLICATIONS

Notice of Pending Litigation Under 37 CFR 1.56 Pursuant to Granted Request for Prioritized Examination Under 37 CFR 1.102€(1), Jun. 28, 2016.

(Continued)

*Primary Examiner* — John C Kuan
(74) *Attorney, Agent, or Firm* — Schwabe Williamson & Wyatt

(57) ABSTRACT

A control system may control multiple devices, such as jacks. The control system may adjust the speeds of the devices based on their distances from associated targets. The control system improves overall walking system performance by more efficiently directing more of the limited resources, such as hydraulic fluid, to the furthest back jacks.

17 Claims, 13 Drawing Sheets

Related U.S. Application Data a continuation-in-part of application No. 15/896,846, filed on Feb. 14, 2018.

(60) Provisional application No. 62/539,969, filed on Aug. 1, 2017.

(51) Int. Cl.
*B66F 3/46* (2006.01)
*E21B 15/00* (2006.01)

(56) References Cited

U.S. PATENT DOCUMENTS

| | | |
|---|---|---|
| 1,289,207 A | 12/1918 | Leach |
| 1,429,551 A | 9/1922 | Anderson |
| 1,615,055 A | 1/1927 | Turner |
| 1,627,249 A | 5/1927 | Page |
| 1,692,121 A | 11/1928 | Grant |
| 1,879,446 A | 2/1931 | Page |
| 1,914,692 A | 6/1933 | Kakaska |
| 1,915,134 A | 6/1933 | MacPherson |
| 2,132,184 A | 10/1937 | Poche |
| 2,164,120 A | 6/1939 | Page |
| 2,247,782 A | 7/1941 | Martinson |
| 2,259,200 A | 10/1941 | Cameron et al. |
| 2,290,118 A | 7/1942 | Page |
| 2,380,431 A | 7/1945 | Harding |
| 2,399,375 A | 4/1946 | Mullins |
| 2,452,632 A | 11/1948 | McLeod |
| 2,541,496 A | 2/1951 | Busick, Jr. |
| 2,616,677 A | 11/1952 | Compton |
| 2,644,691 A | 7/1953 | Pohle |
| 2,660,253 A | 11/1953 | Davidson |
| 2,660,449 A | 11/1953 | MacPherson |
| 2,692,770 A | 10/1954 | Nallinger et al. |
| 2,914,127 A | 8/1955 | Ricouard |
| 2,777,528 A | 1/1957 | Jourdain |
| 2,942,676 A | 12/1957 | Kraus |
| 2,901,240 A | 8/1959 | Fikse |
| 2,935,309 A | 5/1960 | McCarthy |
| 3,078,941 A | 2/1963 | Baron |
| 3,113,661 A | 12/1963 | Linke et al. |
| 3,135,345 A | 6/1964 | Scruggs |
| 3,150,733 A | 9/1964 | Goebel |
| 3,249,168 A | 5/1966 | Klein et al. |
| 3,255,836 A | 6/1966 | Hoppmann et al. |
| 3,265,145 A | 8/1966 | Beitzel |
| 3,334,849 A | 8/1967 | Bronder |
| 3,362,553 A | 1/1968 | Weinmann |
| 3,375,892 A | 4/1968 | Kraschnewski et al. |
| 3,446,301 A | 5/1969 | Thomas |
| 3,448,994 A | 6/1969 | King et al. |
| 3,490,786 A | 1/1970 | Ravenel |
| 3,493,064 A | 2/1970 | Wilson |
| 3,512,597 A | 5/1970 | Baron |
| 3,527,313 A | 9/1970 | Reimann |
| 3,528,341 A | 9/1970 | Rieschel |
| 3,576,225 A | 4/1971 | Chambers |
| 3,595,322 A | 7/1971 | Reimann |
| 3,612,201 A | 10/1971 | Smith |
| 3,638,747 A | 2/1972 | Althoff |
| 3,674,103 A | 7/1972 | Kiekhaefer |
| 3,734,220 A | 5/1973 | Smith |
| 3,754,361 A | 8/1973 | Branham |
| 3,765,499 A | 10/1973 | Harmala |
| 3,767,064 A | 10/1973 | Lutz |
| 3,767,224 A | 10/1973 | Schneeweiss |
| 3,796,276 A | 3/1974 | Maeda |
| 3,807,519 A | 4/1974 | Patch |
| 3,853,196 A | 12/1974 | Guest |
| 3,866,425 A | 2/1975 | Morrice |
| 3,866,835 A | 2/1975 | Dowd |
| 3,921,739 A | 11/1975 | Rich et al. |
| 3,951,225 A | 4/1976 | Schewenk |
| 4,014,399 A | 3/1977 | Ruder |
| 4,021,978 A | 5/1977 | Busse |
| 4,048,936 A | 9/1977 | Uchizono |
| RE29,541 E | 2/1978 | Russell |
| 4,135,340 A | 1/1979 | Cox |
| 4,206,935 A | 6/1980 | Sheppard et al. |
| 4,252,204 A | 2/1981 | Bishop |
| 4,290,495 A | 9/1981 | Elliston |
| 4,296,820 A | 10/1981 | Loftis |
| 4,324,077 A | 4/1982 | Woolslayer |
| 4,324,302 A | 4/1982 | Rabinovitch |
| 4,334,587 A | 6/1982 | Rangaswamy |
| 4,371,041 A | 2/1983 | Becker |
| 4,375,892 A | 3/1983 | Jenkins |
| 4,405,019 A | 9/1983 | Frisbee |
| 4,406,339 A | 9/1983 | Spencer |
| 4,423,560 A | 1/1984 | Rivinius |
| 4,489,954 A | 12/1984 | Yasui et al. |
| 4,491,449 A | 1/1985 | Hawkins |
| 4,555,032 A | 11/1985 | Mick |
| 4,655,467 A | 4/1987 | Kitzmiller et al. |
| 4,759,414 A | 7/1988 | Willis |
| 4,821,816 A | 4/1989 | Willis |
| 4,823,870 A | 4/1989 | Sorokan |
| 4,831,795 A | 5/1989 | Sorokan |
| 4,842,298 A | 6/1989 | Jarvis |
| 5,015,147 A | 5/1991 | Taylor |
| 5,178,406 A | 1/1993 | Reynolds |
| 5,245,882 A | 9/1993 | Kallenberger |
| 5,248,005 A | 9/1993 | Mochizuki |
| 5,398,396 A | 3/1995 | Sanders |
| 5,492,436 A | 2/1996 | Suksumake |
| 5,575,346 A | 11/1996 | Yberle |
| 5,600,905 A | 2/1997 | Kallenberger |
| 5,603,174 A | 2/1997 | Kallenberger |
| 5,613,444 A | 3/1997 | Ahmadian et al. |
| 5,749,596 A | 5/1998 | Jensen et al. |
| 5,794,723 A | 8/1998 | Caneer |
| 5,921,336 A | 7/1999 | Reed |
| 6,089,583 A | 7/2000 | Taipale |
| 6,202,774 B1 | 3/2001 | Claassen et al. |
| 6,203,247 B1 | 3/2001 | Schellstede |
| 6,345,831 B1 | 2/2002 | deMarcellus |
| 6,474,926 B2 | 11/2002 | Weiss |
| 6,554,145 B1 | 4/2003 | Fantuzzi |
| 6,554,305 B2 | 4/2003 | Fulks |
| 6,581,525 B2 | 6/2003 | Smith |
| 6,612,781 B1 | 9/2003 | Jackson |
| 6,651,991 B2 | 11/2003 | Carlstedt et al. |
| 6,820,887 B1 | 11/2004 | Riggle |
| 6,857,483 B1 | 2/2005 | Dirks |
| 6,962,030 B2 | 11/2005 | Conn |
| 7,182,163 B1 | 2/2007 | Gipson |
| 7,308,953 B2 | 12/2007 | Barnes |
| 7,357,616 B2 | 4/2008 | Andrews |
| 7,681,674 B1 | 3/2010 | Barnes et al. |
| 7,806,207 B1 | 10/2010 | Barnes et al. |
| 7,819,209 B1 | 10/2010 | Bezner |
| 7,882,915 B1 | 2/2011 | Wishart |
| 8,019,472 B2 | 9/2011 | Montero |
| 8,051,930 B1 | 11/2011 | Barnes et al. |
| 8,250,816 B2 | 8/2012 | Donnally |
| 8,468,753 B2 | 6/2013 | Donnally |
| 8,490,724 B2 | 7/2013 | Smith et al. |
| 8,490,727 B2 | 7/2013 | Smith et al. |
| 8,544,853 B2 | 10/2013 | Kanaoka |
| 8,556,003 B2 | 10/2013 | Souchek |
| 8,561,733 B2 * | 10/2013 | Smith .................. E21B 15/003 180/8.1 |
| 8,573,334 B2 | 11/2013 | Smith |
| 8,646,549 B2 | 2/2014 | Ledbetter |
| 8,646,976 B2 | 2/2014 | Stoik |
| 8,839,892 B2 | 9/2014 | Smith et al. |
| 8,887,800 B2 | 11/2014 | Havinga |
| 9,004,203 B2 | 4/2015 | Smith |
| 9,045,178 B2 | 6/2015 | Smith |
| 9,096,282 B2 | 8/2015 | Smith et al. |
| 9,415,819 B2 | 8/2016 | Vogt |
| 9,463,833 B2 | 10/2016 | Smith et al. |
| 9,533,723 B2 | 1/2017 | Smith et al. |

(56) References Cited

U.S. PATENT DOCUMENTS

| | | |
|---|---|---|
| 9,751,578 B2 | 9/2017 | Smith |
| 9,862,437 B2 | 1/2018 | Smith et al. |
| RE46,723 E | 2/2018 | Smith et al. |
| 9,938,737 B1 | 4/2018 | Garceau |
| 2002/0175319 A1 | 11/2002 | Green |
| 2002/0185319 A1 | 12/2002 | Smith |
| 2004/0211598 A1 | 10/2004 | Palidis |
| 2004/0240973 A1 | 12/2004 | Andrews |
| 2006/0027373 A1 | 2/2006 | Carriere |
| 2006/0213653 A1 | 9/2006 | Cunningham |
| 2009/0000218 A1 | 1/2009 | Lee |
| 2009/0188677 A1 | 7/2009 | Ditta |
| 2009/0200856 A1 | 8/2009 | Chehade |
| 2009/0283324 A1 | 11/2009 | Konduc |
| 2010/0224841 A1 | 9/2010 | Liljedahl |
| 2010/0252395 A1 | 10/2010 | Lehtonen |
| 2011/0072737 A1 | 3/2011 | Wasterval |
| 2011/0114386 A1 | 5/2011 | Souchek |
| 2012/0219242 A1 | 8/2012 | Stoik |
| 2013/0153309 A1 | 6/2013 | Smith et al. |
| 2013/0156538 A1 | 6/2013 | Smith et al. |
| 2013/0156539 A1 | 6/2013 | Smith et al. |
| 2013/0240300 A1 | 9/2013 | Fagan |
| 2013/0277124 A1 | 10/2013 | Smith et al. |
| 2014/0014417 A1 | 1/2014 | Smith et al. |
| 2014/0054097 A1 | 2/2014 | Bryant |
| 2014/0158342 A1 | 6/2014 | Smith |
| 2014/0161581 A1 | 6/2014 | Smith et al. |
| 2014/0262562 A1* | 9/2014 | Eldib ............... E21B 15/003 180/8.5 |
| 2014/0299564 A1* | 10/2014 | Lin ............... B66C 23/90 212/273 |
| 2015/0053426 A1 | 2/2015 | Smith et al. |
| 2015/0125252 A1 | 5/2015 | Berzen |
| 2015/0166134 A1 | 6/2015 | Trevithick |
| 2015/0166313 A1 | 6/2015 | Knapp |
| 2015/0239580 A1 | 8/2015 | Valenzuela |
| 2016/0023647 A1* | 1/2016 | Saunders ............... B25J 9/126 701/22 |
| 2016/0176255 A1 | 6/2016 | Guiboche |
| 2016/0221620 A1 | 8/2016 | Smith |
| 2016/0297488 A1 | 10/2016 | Smith |
| 2017/0021880 A1 | 1/2017 | Smith |
| 2017/0022765 A1* | 1/2017 | Csergei ............... E21B 15/003 |
| 2017/0101144 A1 | 4/2017 | Higginbotham, II |
| 2017/0327166 A1 | 11/2017 | Smith |
| 2018/0183362 A1 | 6/2018 | Jenner |
| 2018/0072543 A1 | 9/2018 | Rucker |
| 2018/0346041 A1 | 12/2018 | Smith |
| 2019/0016575 A1 | 1/2019 | Unger |
| 2019/0048558 A1 | 2/2019 | Unger |
| 2019/0152704 A1 | 5/2019 | Smith |

FOREIGN PATENT DOCUMENTS

| | | | | |
|---|---|---|---|---|
| CA | 2798774 | | 9/2015 | |
| CA | 2798790 | | 10/2015 | |
| CH | 359422 | | 1/1962 | |
| CN | 1515477 | | 7/2003 | |
| CN | 101139069 A | * | 3/2008 | ............ B66C 13/22 |
| CN | 102566573 B | * | 12/2013 | |
| CN | 105060161 A | * | 11/2015 | |
| CN | 105446271 A | * | 3/2016 | |
| CN | 106672113 A | * | 5/2017 | |
| CN | 107314000 A | * | 11/2017 | ............ B22D 41/00 |
| DE | 2418411 | | 10/1975 | |
| DE | 4107314 | | 9/1992 | |
| EP | 469182 A2 | | 10/1990 | |
| GB | 2315464 | | 2/1998 | |
| WO | 2004103807 | | 12/2004 | |
| WO | 2006100166 | | 9/2006 | |
| WO | 2010136713 | | 12/2010 | |
| WO | WO-2018233649 A1 | * | 12/2018 | ............ B22D 41/00 |

OTHER PUBLICATIONS

Defendants' First Amended Answer, Affirmative Defenses, and Counterclaims to Plaintiff's Complain for Patent Infringement, Jun. 27, 2016, p. 9, section 16.

Defendants' Answer, Affirmative Defenses, and Counterclaims to Plaintiff's Complaint for Patent Infringement, Jun. 6, 2016, p. 6, Section 2.

Entro Industries, Inc. brochure "The Future of Rig Walkers", Jun. 2012; 4 pages.

Columbia Industries, LLC brochure "Kodiak Cub Rig Walking System", 2009; 4 pages.

Defendants' Second Amended Answer, Affirmative Defenses, and Counterclaims to Plaintiff's Complaint for Patent Infringement, Jul. 12, 2016, p. 9, Sections 15-18.

Defendant Hydraulic System, Inc.'s Preliminary Invalidity Contentions, Nov. 18, 2016, pp. 1-6.

Defendant Hydraulic System, Inc.'s Preliminary Invalidity Contentions, May 26, 2017, pp. 1-6.

Colby, Col. Joseph M., "Torsion-Bar Suspension", SAE Quarterly Transactions, vol. 2, No. 2, pp. 195-200, Apr. 1948.

Schwabe Williamson & Wyatt, PC, "Listing of Related Cases", Nov. 15, 2018, 2 pages.

Airstream Inc., "Airstream's New Dura-Torque Axle" Pamphlet. 1962.

* cited by examiner

IF (JACK "X" IS NOT "LEAD") THEN
VALVE "X" ⇐ VALVE "LEAD" - (POSITION "X" - POSITION "LEAD") × CONSTANT

FIG. 7

CONTROLLING LOAD TRANSPORTING DEVICES

This application claims priority to U.S. Provisional Application 62/539,969 filed Aug. 1, 2017, entitled AUTOMATIC EQUAL DISPLACEMENT FOR A LOAD TRANSPORTING APPARATUS, is a continuation-in-part of U.S. patent application Ser. No. 15/807,176, entitled: LIFTING LOAD WITH LIFTING DEVICES filed Nov. 8, 2017, and is a continuation-in-part of U.S. patent application Ser. No. 15/896,846 entitled: AUTOMATIC WALKING FOR LOAD TRANSPORTING APPARATUS filed Feb. 14, 2018, the contents of which are all hereby incorporated by reference in their entireties.

U.S. Pat. Nos. 8,490,724; 8,561,733; 8,839,892; 8,573,334; and 9,004,203 are all incorporated by reference in their entireties.

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

This disclosure relates generally to apparatuses for transporting a load, and more particularly to automatically detecting, raising, lowering, and moving loads.

BACKGROUND

Moving extremely heavy loads has generally been a complicated task because of the large forces involved in lifting and transporting the heavy loads. When possible, large loads are often transported by disassembling or breaking up the load into multiple smaller loads. However, this break-down and subsequent reassembly process can be very time consuming, especially when a heavy load is only moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled wells in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Parker and U.S. Pat. No. 6,581,525 to Smith show two methods of using walking machines to move heavy loads, such as oil rig structures. The '525 patent shows elongated beams under several rollers and lift cylinders, which allow the load from the lift cylinders and rollers to be spread over a large area.

The operator may activate all lifting devices simultaneously until a first lifting device begins lifting the load off of the base surface. The operator then manually activates the remaining lifting devices currently not contacting the base surface. After all lifting devices are in contact with the base surface, the operator causes all lifting devices to lift all load points together to lift the load off of the base surface.

Due to load, mechanical, ground, and hydraulic inconsistencies, the lift cylinders in the lifting devices may extend at different rates. For example, there may be different ground compaction conditions at different lift points that require different lifting device extensions. These variable conditions require an operator to walk around the entire structure and manually control each individual lift point. This manual operation also typically includes stopped periods between lifting all and lifting individual points. For example, the operator may lift all lifting devices simultaneously and stop a lifting device that gets too far ahead or stop three lifting devices when a fourth lifting device gets behind. These manual inspections and stopped periods for lifting all and lifting individual points adds a substantial amount of time to the stepping cycles.

BRIEF DESCRIPTION OF THE DRAWINGS

FIG. 7 shows a process for adjusting jack valve positions based on a relative position from the furthest back jack.

DETAILED DESCRIPTION

Hydraulic control systems may only be able to supply limited amounts of hydraulic fluid to jacks. Due to different operating conditions, a particular jack may be lagging further behind other jacks. However, the hydraulic system may continue to supply hydraulic fluid to each jack at approximately the same flow rate. The hydraulic system inefficiently moves, lifts, or lowers the load since too much of the limited hydraulic fluid is directed to jacks that are relatively close to associated targets.

A control system may control multiple stepping devices, such as jacks. The control system may identify how far current states of the jacks are from associated targets. The control system may identify one of the jacks furthest back from an associated target. The control system may adjust the speeds, or other parameters, of the jacks based on how far the jacks are ahead of the furthest back jack. The control system improves overall walking system performance by more efficiently directing more of the limited resources, such as hydraulic fluid, to the furthest back jacks.

As described above, walkers, or walking machines, are vehicles that transport heavy loads, such as entire oil well drilling rigs. Such loads weigh as much as several thousand tons and may be required to be sequentially positioned very precisely over spaced-apart well bores, for example. Embodiments of the present concept are directed to controlling walking apparatuses, such as walking machines, for moving heavy loads over small distances with the ability to fine tune the resultant position of the heavy load.

For ease of understanding, the terms, "walkers," "walking machines," "walking devices," "walking apparatuses", "lifting devices", "devices", and "jacks" are all used interchangeably below. Additionally, a walking machine's subassembly of components that facilitate movement of the walking machine are referred herein as a "control system".

FIGS. 1A-1F show a control system 100 that streamlines the process of lifting a structure consistently on a number of lift points. Control system 100 may include jacks 115 that provide multiple lift points at different corners of a load 110. Jacks 115 are alternatively referred to as walking apparatus and are described in U.S. Pat. No. 8,490,724 which is incorporated by reference in its entirety.

Figure 1A:
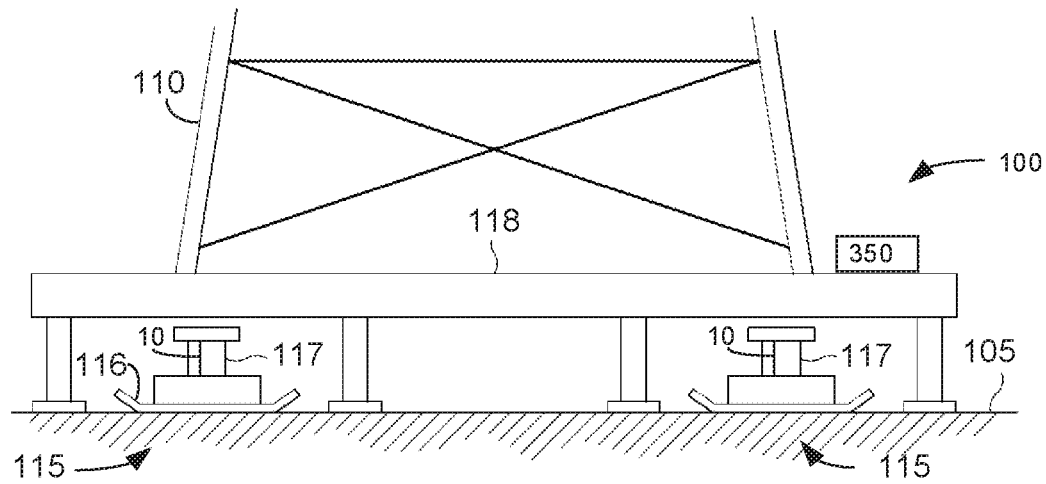
FIGS. 1A-1F show a stepping operation for a transporting apparatus.
Figure 1B:
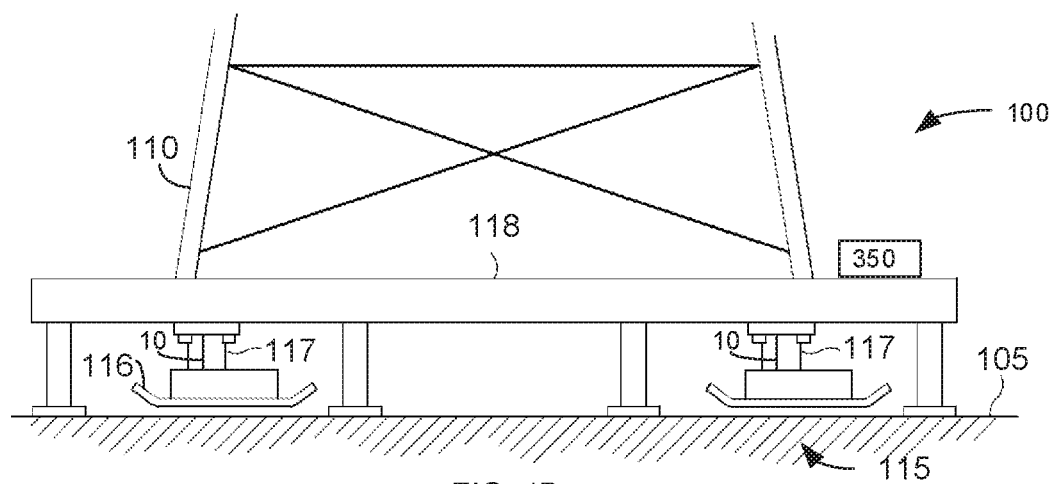

Referring to FIG. 1A, walking apparatuses 115 are positioned on a base surface 105 below or adjacent to a load 110. Referring to FIG. 1B, the walking apparatus 115 may attach to load 110 and in a retracted position may extend above base surface 105. There are many possible connection variations for connecting the walking apparatuses 115 to load 110. For example, walking apparatus 115 may attach to a load bearing frame 118 that supports load 110.

Figure 1C:
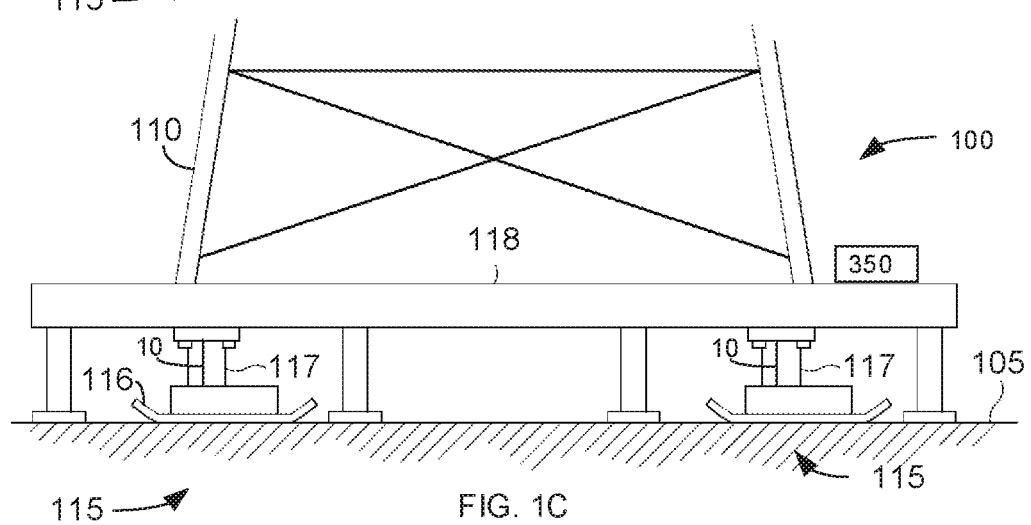

Referring to FIG. 1C, walking apparatuses 115 are operated so that a portion of support feet 116 contact base surface 105. Walking apparatuses 115 may be operated substantially simultaneously, or may be operated in intervals depending on the conditions of base surface 105 and loading by load 110.

Figure 1D:
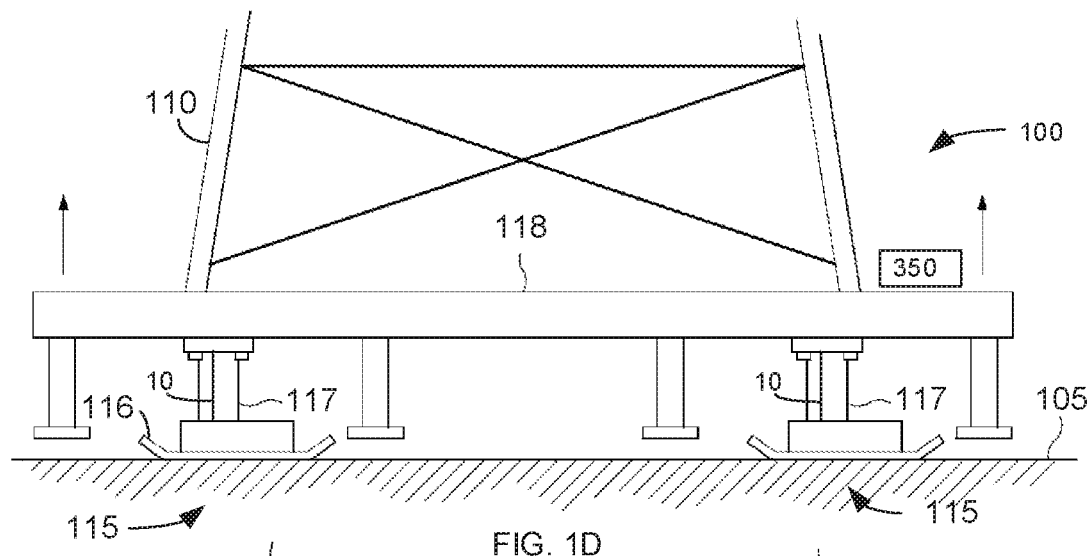

Referring to FIG. 1D, walking apparatuses 115 are operated to lift load 110 above base surface 105. Walking apparatuses 115 again may be operated substantially simultaneously to lift the load 110, or may be operated in intervals depending on the ground and load conditions associated with the desired move.

Figure 1E:
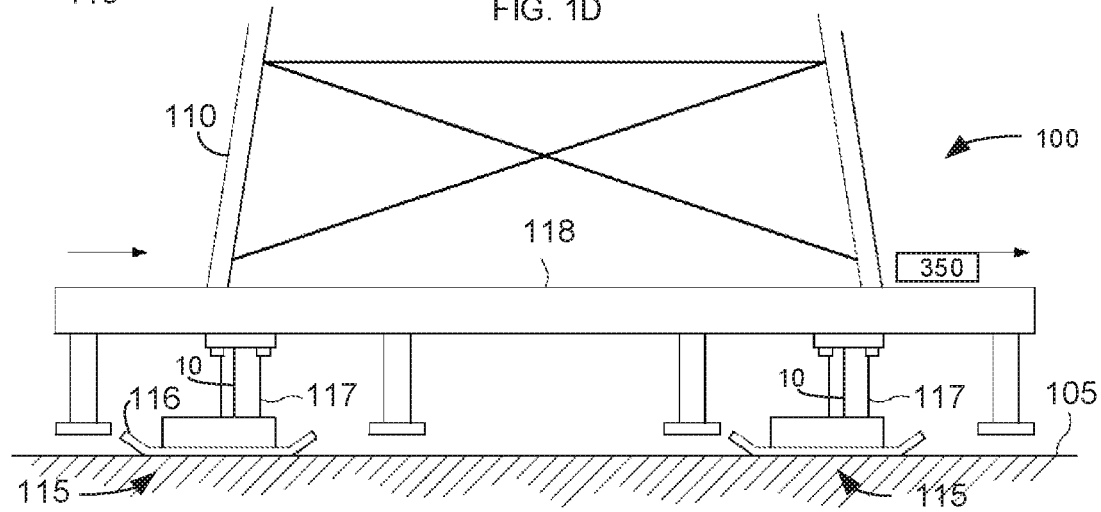

Referring to FIG. 1E, walking apparatuses 115 are operated to move load 110 to the right. Although FIG. 1E shows load 110 being moved to the right, walking apparatuses 115 can be operated to move load 110 in a variety of directions depending on the desired final location.

Figure 1F:
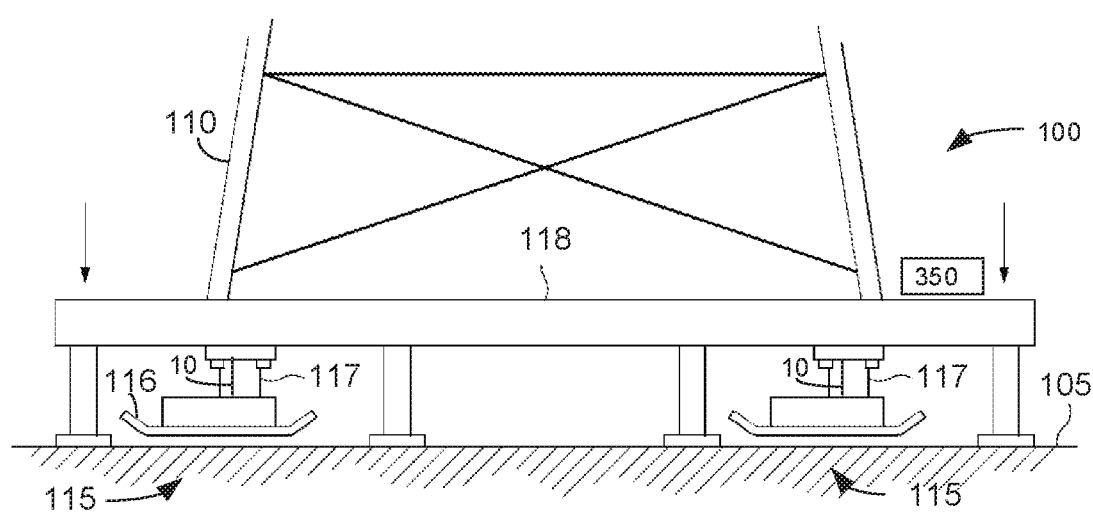

Referring to FIG. 1F, walking apparatuses 115 are operated to lower load 110 to base surface 105 and to raise feet 116 of walking apparatus 115 above base surface 105. That is, after load 110 is positioned on base surface 105, walking apparatuses 115 are further operated so that they are raised above base surface 105. Here, the connection between walking apparatuses 115 and load 110 support the walking apparatuses 115 when raised above base surface 105.

After walking apparatuses 115 are raised above base surface 105, they are further operated to be repositioned for another movement walking step, such as by moving support feet 116 to the right in a position as shown in FIG. 1B. That is support feet 116 and related structures are moved to the right while raised above base surface 105. After walking apparatuses 115 have been repositioned, they are lowered to base surface 105 as shown in FIG. 1C. This completes a single walking cycle, and further walking cycles or steps can be performed by repeating the steps described above with respect to FIGS. 1B to 1F.

The following terms are for explanation purposes and it should be understood that other terms and definitions may be used to further describe these elements.

Lift Point: May refer to a point on a structure where a walking apparatus lifts a structure.

Load: May refer to any amount of substance or weight lifted or supported by an individual walking apparatus or may refer to an entire amount of substance or weight lifted by all of the walking apparatus.

Walking Apparatus: May refer to an apparatus configured to move a load over a base surface.

Load-Bearing Frame: May refer to the frame holding the load. The walking apparatus may lift the load through the load-bearing frame. This is often either a frame that the entire load sits on or a smaller frame that is welded to the load or pinned to the load. In other example, the walking apparatus may lift the load directly.

Jack: May refer to a device used for lifting the load off of the base surface. The jack may include a hydraulic cylinder, but can be anything capable of creating a displacement that can support or move a load such as, but not limited to, a pneumatic cylinder, rack and pinion gear with a motor, screw with a motor, or any combination of the above apparatus with linkage that redirects the useful motion.

Support Foot: May refer to a relatively stiff surface area used to distribute the load on a jack over an area on the base surface. Often used to lower the ground bearing pressure on the base surface.

Base Surface: May refer to a surface under the load and load-bearing frame.

Control System: May refer to a system of sensors, controllable devices, and a computer used to automatically manipulate a device.

Computer: May refer to a device, such as a microcontroller programmable to manipulate outputs based on information from inputs. The computer may operate a software program that includes logic which repeatedly produces a known and specific output based on an input.

Remote control device: May refer to a device used to receive inputs for the computer and display outputs from the computer. In one embodiment, the remote control device is wireless. Inputs may include angle set points, valve position set points, steering mode, automatic mode, or autowalk direction and magnitude. Outputs may be light emitting diodes (LEDs), display data on a screen, and commands sent to control system 100 for controlling movements of the walking apparatus and jacks.

Load Sensor: May refer to a device used to measure, either directly or indirectly, the load on a jack. One example embodiment includes a pressure sensor that measures pressure on the bore side of a jack cylinder. The computer converts the bore pressure to a load applied on the diameter of the bore. Other example embodiments may include a sensor that measures displacement of a component with a known load vs displacement relationship. The computer may convert this displacement to a load based on the load vs displacement relationship.

Displacement Sensor: May refer to a device used to measure, either directly or indirectly, the displacement of a jack. One example embodiment consists of a displacement sensor that detects the position of a cylinder rod in the jack. Other example, embodiments may consist of optical sensors, ultrasonic sensors, string sensors, or rotary sensors with a mechanical conversion from a linear position.

Lead Jack/Furthest Back Jack: May refer to a jack where other jacks adjust displacement speeds to match the displacement of the lead jack. All other jacks may follow the lead jack displacement. The lead jack has an associated valve position.

Valve Position: May refer to any hydraulic, mechanical, or electrical indication of a displacement speed and/or an amount of additional displacement speed available to the jack. In one example, a low valve position may refer to a relatively slow displacement speed and a high valve position may refer to a relatively fast displacement speed. A higher valve position may indicate that the jack has less available capacity for increasing the displacement speed. A maximum valve position may refer to a maximum jack displacement speed and no additional capacity to increase the displacement speed.

Throttle position, remote control paddle position, and movement values may all similarly refer to a desired displacement speed specified by the user or by the computer.

Lifted State: A state at which the entire load has been lifted above the base surface.

Jack Control

The following operations may be performed during the step cycles described above.

Lifting Phase 1. Extend a jack 117 for each walking apparatus 115 to a point where each support foot 116 begins to press into base surface 105.

Lifting Phase 2. Extend each jack 117 to transfer load 110 from load-bearing frame 118 to jack 117 resulting in a loaded state.

Lifting Phase 3. Extend each jack 117 a similar amount of displacement resulting in a lifted state. In the lifted state, as shown in FIGS. 1D and 1E, load-bearing frame 118 is lifted up off of ground surface 105.

Lowering Phase 4. Retract each jack 117 a similar amount of displacement, lowering load-bearing frame 118 back onto base surface 105 and then further retracting each jack 117 to lift support feet 116 off of base surface 105 as shown in FIG. 1F.

Control system 100 automates and streamlines all four lifting phases, using a computer and displacement sensors to consistently and more effectively lift load 110 on a number of lift points. Phase 2 and 4 may use additional load sensors to sense the load transferred to and from the jack. The operations described below can be used in any of the four lifting phases. It should also be understood that some of the operations described below may also provide more efficient horizonal movement of load bearing frame 118 as shown in FIG. 1E or more efficient usage of any other type of lifting, traveling, or moving device.

In any of the four phases, control system 100 may monitor the displacement of each jack 117 and adjust associated valves so jacks 117 either maintain substantially the same amount of displacement and/or reach target points more quickly. The valve control increases or reduces the speed of each jack 117. A normal jack displacement speed may be slower than full open throttle. Control system 100 may avoid some throttled back operations by monitoring and comparing states, such as valve positions, cylinder displacements, and/or loading for different jacks 117.

For example, a first jack 117 may have a cylinder displacement behind a second, third, and fourth jacks 117 and the first jack 117 may have a valve position that is equal to or greater than the second, third, and fourth jacks 117. Control system 100 may proportionally throttle down the second, third, and fourth jack 117 such that the distances of the jacks relative to their respective targets becomes equal after some time.

Control system 100 may tag the jack lagging the furthest behind and with the greatest or equivalent valve position as the "lead" jack. Control system 100 then may throttle back the displacement speeds of the other jacks 117 to allow the lead jack to catch up. Control system 100 may repeatedly monitor and identify new lead jacks based on current states relative to associated targets. Control system 100 may increase the displacement speed of the lagging jack that is not fully throttled. The displacement speed of the lagging jack is increased, or the displacement speeds of the other jacks are reduced, until the lagging jack catches up with other jacks.

Figure 2:
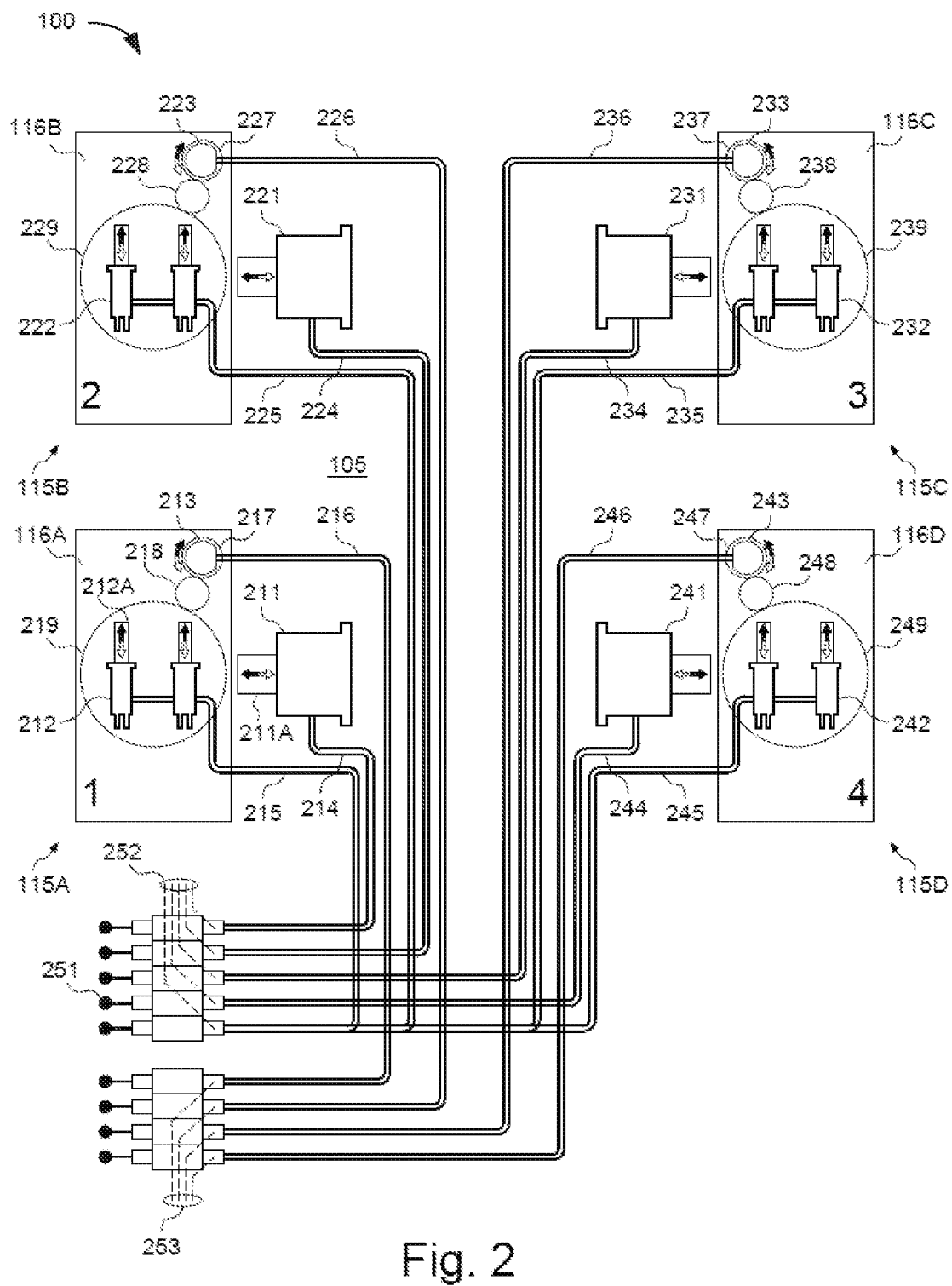
FIG. 2 shows a control system used for raising a load.

FIG. 2 shows control system 100 in more detail. This example embodiment shows hydraulic valves, cylinders, and motors with interconnected hydraulic lines. Other embodiments may include electrical controls or mechanical controls.

Figure 3:
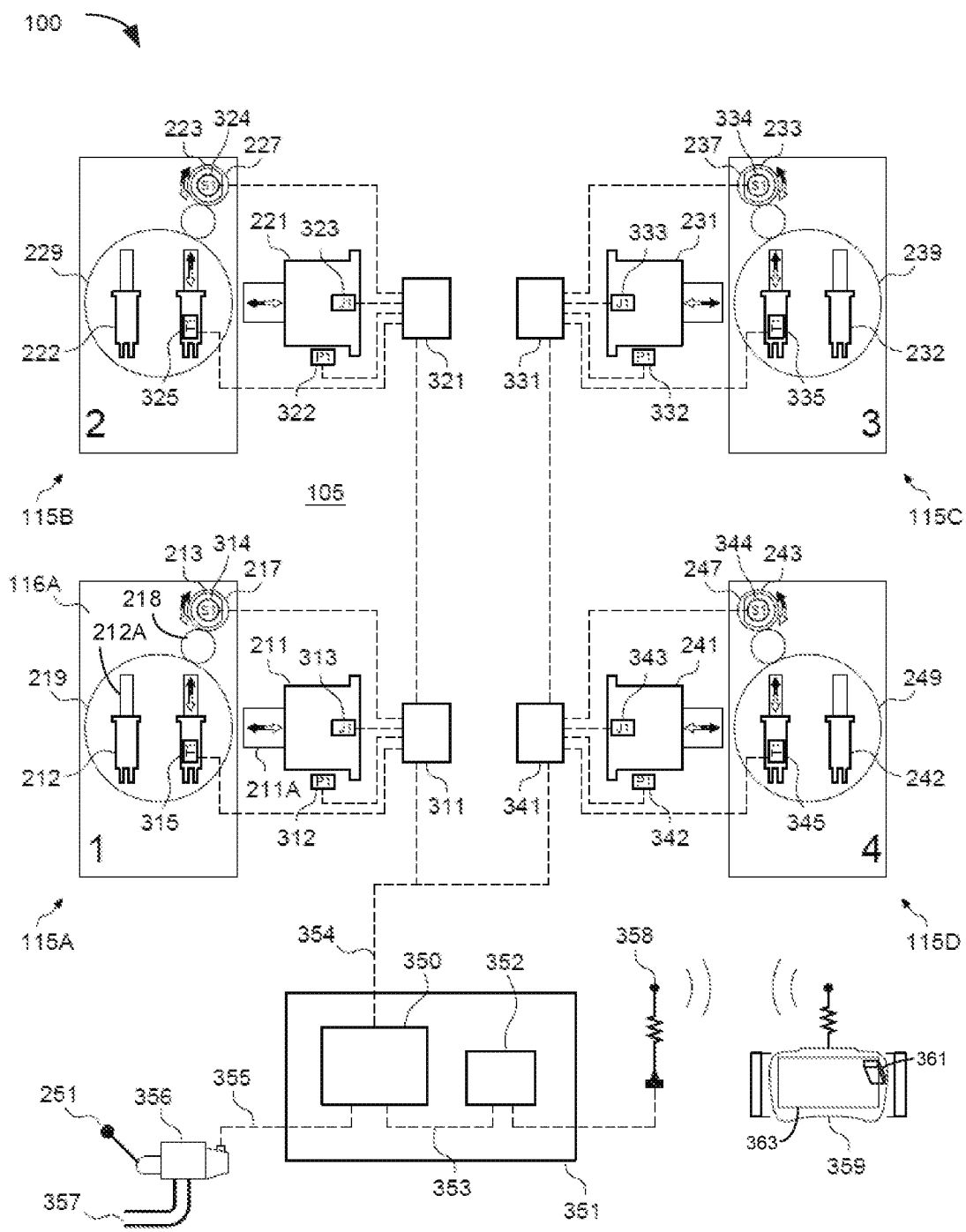
FIG. 3 shows sensors used in the control system of FIG. 2.

Jacks 211, 221, 231, and 241 in FIGS. 2 and 3 correspond to jacks 117 in FIGS. 1A-1F. Jacks 211, 221, 231, and 241 are shown in sideways horizontal positions in the schematics of FIGS. 2 and 3 for explanation purposes. However, it should be understood that jacks 211, 221, 231, and 241 are typically arranged as shown by jacks 117 in FIGS. 1A-1F to extend and retract vertically to lift and lower load bearing frame 118 and attached load 110.

Walking apparatus 115A may use jack 211 to lift up and lower a lift point 1 on the load. In one example jack 211 may include a hydraulic cylinder 211A, similar to that shown in lifting mechanism 720 of U.S. Pat. No. 8,561,733. A translation device 212 may include two hydraulic cylinders 212A that move support foot 116A relative to the load resulting in a translation of lift point 1 relative to the base surface when jack 211 is in a loaded state. One example, embodiment of translation device 212 may include hydraulic cylinders used in travel mechanism 860 of U.S. Pat. No. 8,561,733.

Some of the example operations below are described with respect to jacks 211, 221, 231, and 241. However, it should be understood any of the described operations may also be used in conjunction with translation devices 212, 222, 232, and 242.

A steering device 213 rotates an orientation of translation device 212 relative to the load resulting in a translation of walking apparatus 115A in a specific direction relative to base surface 105 when jack 211 in a loaded state. In one example, steering device 213 is a hydraulic motor.

A lifting control signal 214 causes jack 211 to extend or retract lifting or lowering foot 116A relative to the load. In one example, lifting control signal 214 may include a set of two hydraulic lines to pressurize the bore or the rod side of cylinder 211A in jack 211. Bore side pressure may extend cylinder 211A and rod side pressure may retract cylinder 211A. Lifting control signal 214 may control the displacement speed of jack 211 and may correspond to the valve position, throttle position, and/or movement values described below.

A translation control signal 215 may cause translation device 212 to extend or retract and translate (move) foot 116A relative to the load. In one example embodiment, control signal 215 may include a set of hydraulic lines that pressurize the bore or the rod side of cylinders 212A in translation device 212. A bore side pressure may extend cylinders 212A and a rod side pressure may retract cylinders 212A.

A steering control signal 216 may cause steering device 213 to rotate clockwise or counterclockwise. This adjusts the orientation of translation device 212 with respect to the load. In one embodiment, steering control signal 216 may include a set of hydraulic lines. One of the hydraulic lines may rotate steering device 213 in a clockwise rotation while the other hydraulic line may rotate steering device 213 in a counterclockwise rotation.

A drive pinion 217 may transmit a torque causing steering device 213 to move into an idle state. An idle pinion 218 may maintain a clockwise rotation of a bull gear 219 for a clockwise rotation of drive pinion 217. Rotation of bull gear 219 rotates the orientation of translation device 212.

Walking apparatus 115B-115D operate similar to walking apparatus 115A and may include jacks 221, 231, and 241, respectively, that operate similar to jack 211. Walking apparatus 115B-115D may include translation devices 222, 232, and 242, respectively that operate similar to translation device 212. Walking apparatus 115B-115D may move feet 116B-116D, respectively, relative to the load resulting in a translation of lift points 2, 3, and 4, respectively, relative to base surface 105 when jack 221, 231, and 241, respectively, are in a loaded state.

Walking apparatus 115B-115D may include steering devices 223, 233, and 243, respectively that operate similar to steering device 213. Steering devices 223, 233, and 243 may rotate orientations of translation device 222, 232, and 242, respectively, relative to the load.

Walking apparatus 115B-115D may include lifting control signals 224, 234, and 244, respectively that operate similar to lifting control signal 214 extending or retracting cylinders in jacks 221, 231, and 241, respectively. This results in lifting or lowering feet 116B, 116C, and 116D, respectively. As discussed in more detail below, control signals 214, 224, 234, and 244 may determine the position of hydraulic valves that control the speeds jacks 211, 221, 231, and 241, respectively, raise and lower hydraulic cylinders that raise and lower load 110.

Walking apparatus 115B-115D may include translation control signals 225, 235, and 245, respectively, that operate similar to translation control signal 215 and cause cylinders in translation devices 222, 232, and 242 to extend or retract and correspondingly translate (move) feet 116B, 116C, and 116D, respectively, relative to the load.

Walking apparatus 115B-115D may include steering control signals 226, 236, and 246, respectively, that operate similar to steering control signal 216 and cause steering devices 223, 233, and 243, respectively, to rotate clockwise or counterclockwise. This rotation adjusts the orientation of the translation devices on bull gears 229, 239, and 249, respectively, with respect to the load.

Walking apparatus 115B-115D may include drive pinions 227, 237, and 247, respectively that operate similar to drive pinion 217 and transmit a torque causing steering devices 223, 233, and 243 to move into idle states. Idle pinions 228, 238, and 248 may operate similar to idle pinion 218 and maintain a clockwise rotation of bull gears 229, 239, and 249, respectively, for a clockwise rotation of drive pinions 227, 237, and 247, respectively.

Control handles 251 may create manual input signals for inputting to any of the control signal lines. Computer control signals 252 are used for controlling the translation and lifting in walking apparatus 115A-115D and are generated by computer 350 shown in FIGS. 1A-1F and FIG. 3 and may be converted into hydraulic control signals as described above. Computer control signals 253 are also used for steering walking apparatus 115A-115D and are generated by computer 350 and may be converted into hydraulic control signals as described above.

Control system 100 may use control signals 253 to control the displacement of jacks 211, 221, 231, and 241 and determine the associated valve position and/or throttle position for the hydraulic cylinders that raise and lower the load. For example, computer 350 may generate pulse width modulation (PWM), voltage, current or digital signals 252 and 253 that proportionally control the displacement of valves that produce the hydraulic control signals.

FIG. 3 shows an overview of the sensors and processors used in control system 100. One example embodiment shows an electrical network bus 354 connecting a control panel 351 to multiple different sensors P, T, S and J located on each walking apparatus 115A-115D. Other example embodiments may consist of direct electrical lines connected to each sensor P, T, S, and J, wireless signals communicating with sensors P, T, S, and J, or hydraulic or mechanical feedback from the lifting, transition, and/or rotation devices in walking apparatus 115A-115D. Sensors P, T, S, and J may refer to sensors located at any one of walking apparatuses 115A-115D. Sensors P1-P4, T1-T4, S1-S4, and J1-J4 refer to sensors located at a specific walking apparatus 115A-115D respectively.

Walking apparatuses 115A, 115B, 115C, and 115D may include associated sub-panels 311, 321, 331, and 341, respectively that connect associated sensors P, J, S, and T to network bus 354. Other example embodiments may include tee's or separate bus lines 354 running to each sensor. Sub-panels 311, 321, 331, and 341 may contain separate controllers, such as proportional integral derivative (PID) control devices that may perform some of the operations described below.

The explanation below may refer to sensors P, T, J, and S associated with a specific walking apparatus 115. It should be understood that the sensors P, T, J, and S may be connected and operate similarly in any of walking apparatuses 115A, 115B, 115C, and 115D. Sensors P1, J1, S1, and T1 in walking apparatus 115A are alternatively referred to by reference numbers 312, 313, 314, and 315, respectively.

Sensors P2, J2, S2, and T2 in walking apparatus 115B are alternatively referred to by reference numbers 322, 323, 324, and 325, respectively. Sensors P3, J3, S3, and T3 in walking apparatus 115C are alternatively referred to by reference numbers 332, 333, 334, and 335, respectively. Sensors P4, J4, S4, and T4 in walking apparatus 115D are alternatively referred to by reference numbers 342, 343, 344, and 345, respectively. Again, in other examples, there may be more or fewer walking apparatuses. For example, three walking apparatuses 115 may lift the load bearing frame from three different zones or five walking apparatuses 115 may lift the load bearing frame from five different zones.

Referring to walking apparatus 115A, pressure sensor 312 senses the pressure on jack 211. The sensed pressure is converted into a load value by program logic run by processor 350 based on the area of the bore side of cylinder 211A. Other example embodiments may include directly measuring load between jack 211 and the load or between jack 211 and base surface 105. Another example embodiment may measure deflection of members coupled to jack 211 and configured to identify the load carried by jack 211.

Jack displacement sensor 313 senses displacement of jack 211. This example embodiment shows sensor 313 embedded inside jack 211 and directly measuring the displacement of cylinder 211A. Other example embodiments may include external linear displacement sensors, rotary sensors connected to a rack and pinion, optical distance sensors, ultrasonic distance sensors, or string pot sensors. Displacement sensor 313 also may identify the valve position or throttle position that determines how fast jack 211 is displaced and identifies a maximum available displacement speed.

Steering device sensor 314 senses the orientation of steering device 213. This example embodiment shows a rotary position sensor 314 mounted on the back of steering device 213 which is coupled to bull gear 219 through idle pinion gear 218. Other example embodiments may include a linear position sensor coupled to bull gear 219 through a chain or cable that wraps around bull gear 219, an optical sensor counting teeth on bull gear 219, or a rotary position sensor mounded directly to bull gear 219.

A translation device sensor 315 senses the position of translation device 212. In one example embodiment, a linear displacement sensor 315 is mounted inside translation device 212 and senses the position of pistons 212A inside of translation device 212. Other embodiments may include other types of sensors measuring either directly or indirectly the extension position of translation device 212. Another example embodiment may include sensors that detect when pistons 212A in translation device 212 are fully extended or fully retracted.

As mentioned above, pressure sensors 322, 332, and 342 in walking apparatus 115B-115D, respectively, may operate similar to pressure sensor 312 in walking apparatus 115A. Displacement sensors 323, 333, and 343 in walking apparatus 115B-115D, respectively, may operate similar to displacement sensor 313 in walking apparatus 115A. Steering device sensors 324, 334, and 344 in walking apparatus 115B-115D, respectively, may operate similar to steering device sensor 314 in walking apparatus 115A. Translation device sensors 325, 335, and 345 in walking apparatus 115B-115D, respectively, may operate similar to translation device sensor 315 in walking apparatus 115A.

Control panel 351 houses some of the electrical equipment used in control system 100. Computer 350 uses pre-programmed logic to control walking apparatus 115A-115D based on inputs from any of sensors P1, J1, S1, and T1. A wireless receiver 352 receives and sends information back and forth between computer 350 and a remote control device 359.

Communication link 353 connects wireless receiver 352 with computer 350. In one example embodiment, communication link 353 may be a controller area network (CAN) connection. Other embodiments may include direct data lines.

Communication link 354 connects computer 350 with sensors P, J, S, and T in walking apparatus 115A-115D. As mentioned above, communication link 354 may comprise a network line or bus running between sensors P, J, S, and T in walking apparatus 115A-115D and computer 350. Other embodiments may include separate data lines directly connected to each sensor identifying individual voltage, current, and/or digital information. In another embodiment, communication link 354 may include wireless signals shared between sensors P, J, S, and T and computer 350.

Communication link 355 may connect computer 350 with control device 356. Data on communication link 355 may inform control device 356 how to control jacks 211, 221, 231, and 241; translation devices 212, 222, 232, and 242; and steering devices 213, 223, 233, and 243. In one embodiment, computer 350 and control device 356 may communicate via pulse width modulation (PWM) signals. In other embodiments, any of control device 356, computer 350, remote control device 359, and/or sensors P, J, S, and T may communicate via a network, such as a local area network (LAN), universal serial bus (USB) network, wireless WiFi network, CAN bus, or a wide area network (WAN) alternatively referred to as the Internet.

Control lines 357 from control device 356 may send control information received from computer 350 or manual controls received via a user controlled paddle 251 to jacks 211, 221, 231, and 241; translation devices 212, 222, 232, and 242; and steering devices 213, 223, 233, and 243. In one example, control lines 357 include hydraulic lines which control hydraulic pressure and flow to each of the devices.

Antenna 358 is used to receive wireless signals transmitted between receiver 352 and remote control device 359. In one example, antenna 358 receives and transmits wireless signals, such as infrared (IR), Bluetooth, radio, WiFi, etc. Other embodiments may include wires directly connected between remote control device 359 and electrical components in control panel 351.

Remote control device 359 receives inputs from an operator for controlling control system 100. The operator may initiate and control stepping operations using a paddle 361. The amount paddle 361 is moved upwards or downwards may determine the amount, and associated speed, that computer 350 raises or lowers jacks 211, 221, 231, and 241. In one example, remote control device 359 is a hand-held unit. In other example embodiments, remote control device 359 may mount directly onto control panel 351 or onto some other components in control system 100.

Remote control device 359 may include additional buttons, a touch screen, paddles, etc. that an operator may use to input control information and commands sent to control system 100. A display screen 363 in remote control device 359 may receive and display information associated with control system 100. Wireless receiver 352 may convert control signals received from remote control device 359 into network messages to computer 350. Computer 350 then may control jacks 211, 221, 231, and 241; translation devices 212, 222, 232, and 242; and steering devices 213, 223, 233, and 243 based on the network messages and commands received from remote control device 359 and the data received from sensors P, T, S, and J.

Figure 4:
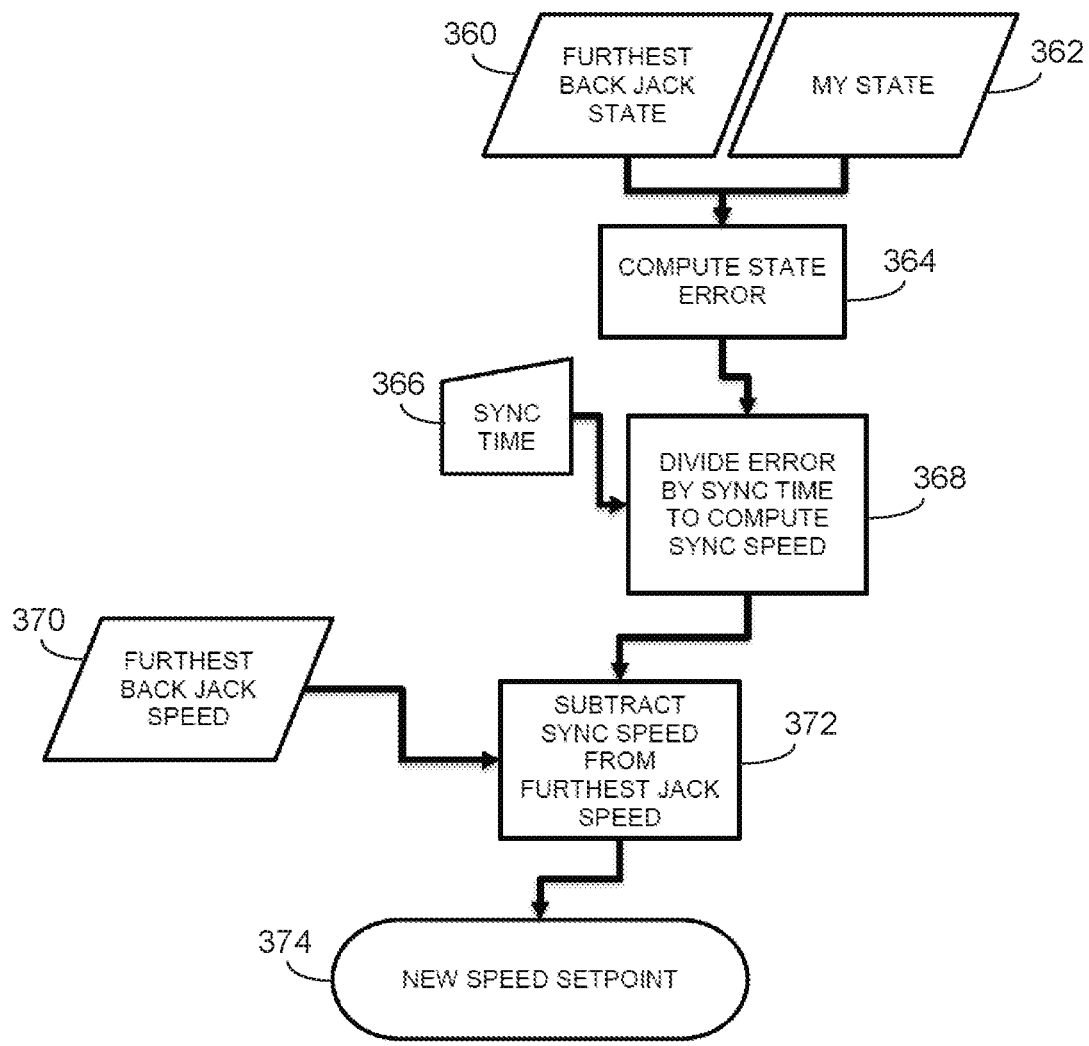
FIG. 4 shows a process for moving jacks relative to a furthest back jack.

FIG. 4 shows one example of how control system 100 may perform operations for synchronizing jacks 211-241, steering devices 213-243, or any other device. The jacks are alternatively referred to as lifting, lowering, or moving devices. While four jacks are described above and below, it should be understood that any number of jacks can be controlled, such as three jacks located in three zones underneath the load bearing frame or five jacks located in five different zones underneath the load bearing frame.

Again, the operations described below may use the example of lifting a load bearing frame off of a ground surface. However, the same operations may be used for controlling the translation devices in the walking apparatus that move the load horizontally over the ground surface.

In operation 362, the control system may identify states of the jacks. The jack states may refer to any measurable and/or calculable parameter for a particular walking apparatus useful in adjusting an associated speed. For example, state may include positions of the jacks relative to associated targets or positions relative to the other jacks. In another example, the states may include an amount of loading or load slopes of the jacks relative to associated target loading values or relative to the loading values of the other jacks. States of the jacks may include any other configured parameter or current condition associated with the jacks.

The jack state may include, or be determined based on, more than one parameter. For example, the jack state may include, but is not limited to, any combination of one or more of the following parameters.

Jack Bore Pressure,
Jack Rod Pressure,
Jack Load,
Jack Position,
Jack Load Slope,
Jack Load Slope Ratio,
Jack Speed,
Travel Rod Pressure,
Travel Bore Pressure,
Travel load,
Travel Position,
Travel Speed,
Bull Gear Angle,
Bull Gear Speed,
Foot X Position, and
Foot Y Position.

In operation 360, the control system identifies one of the jacks in a furthest back state. The jack with the furthest back state may depend on the lifting or moving phase of the walking apparatus and the associated jack targets. For example, during the first lifting phase 1 the jacks are lowered from retracted positions to the base surface. The control system may identify the most retracted jack, or the jack furthest from the base surface, as having the furthest back jack state. During the second lifting phase 2 the jacks start pressing against the ground transferring the load from the load bearing frame to the jacks. The control system may identify the jack with the least amount of load, or with a smallest load slope value, as having the furthest back jack state.

In the third lifting phase 3, the jacks may be extended by different amounts but then further extended by equal amounts to evenly lift the load bearing frame above the base surface. The control system may take into account the relative loaded state positions of each jack when identifying the furthest back jack. In fourth lifting phase 4, the jacks are retracted to first lower the load bearing frame onto the base surface and then further retracted to lift the jacks off of the base surface. During some jack retraction operations, the control system may identify the most extended jack, relative to associated starting positions, as the furthest back jack.

If operation 364, the control system computes a state error between the furthest back jack state and the current states of each of the other jacks. In one example, the control system may identify differences between the extended position of the furthest back jack and the extended positions for each of the other jacks. In another example, the control system may identify differences between the current load slope of the furthest back jack and the current load slopes for each of the other jacks.

In operation 368, the control system computes a synchronization speed by dividing the state errors for each of the other jacks by a synchronization time provided in operation 366. For example, the control system may divide the state errors by a synchronization time of 1 second to generate synchronization speeds for each of the jacks. Of course, other synchronization times may be used in operation 366 based on desired magnitudes of the synchronization speeds, how fast the jacks are current moving, fluid capacity, jack state, etc.

In operation 370, the control system identifies the speed of the furthest back jack. The speed may be determined from the position sensors that measure the position change of the jack during multiple sampling periods. In operation 372, the control system subtracts the synchronization speeds calculated for each of the jacks from the furthest back jack speed identified in operation 370.

In operation 374, the control system uses the speed differences as new speed setpoints for the jacks. In other words, the control system may reduce the current speeds for each of the jacks proportionally to the amount the jacks are ahead of the furthest back jack. The speeds may be reduced by reducing the amount of hydraulic fluid directed to the jacks. Due to limited amounts of hydraulic fluid, reducing the amount of hydraulic fluid to the furthest ahead jacks may redirect more hydraulic fluid to the furthest back jack. Thus, less hydraulic fluid is wasted on jacks that are closer to their associated targets.

The difference between the synchronization speeds and the furthest back jack speed may be negative. The control system may set the new speed setpoint for the jacks with negative speed setpoint values to zero. This avoids using the limited hydraulic fluid flow to move jacks in reverse directions.

In one example, the control system may use the operations in FIG. 4 to lift multiple jacks the same relative distances above the ground surface. For example, due to ground compression and other irregularities in the base surface, the jacks may have to extend different amounts to transfer the load from the load bearing frame. After the load is transferred to the jacks, the control system may use the operations in FIG. 4 to maintain the same relative distances between each of the jacks. Any jack that falls behind and changes its loaded position relative to other jacks may be identified as the further back jack. The amount the furthest back jack falls behind relative to each of the other jacks is computed as the state error in operation 364.

Figure 5:
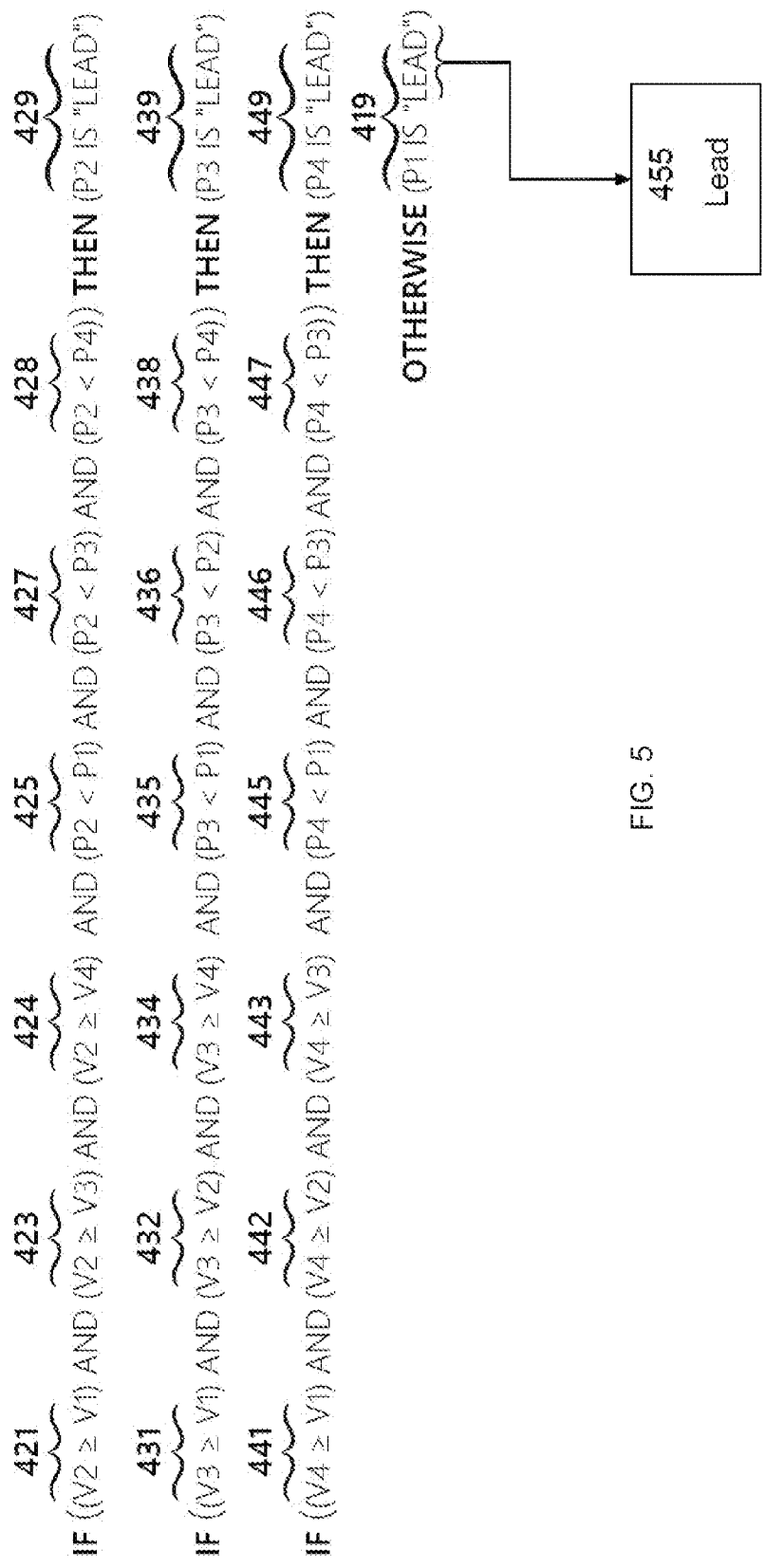
FIG. 5 shows a process for identifying the furthest back jack.

FIG. 5 shows in more detail one example of how the control system identifies the furthest back jack. The furthest back jack is also referred to as the lead jack. Again, this is just one example and as explained above a variety of different jack states may determine the furthest back jack or lead jack.

The example in FIG. 5 includes four jacks referred to as jack 1, jack 2, jack 3 and jack 4. In one example, jacks 1-4 may be located at different corners of a load bearing frame 118 in FIGS. 1A-1F. In other examples, there may be fewer or more jacks located in other lift points underneath load bearing frame 118 or underneath a load 110. In this example, jack 1 defaults as the lead jack when jacks 2, 3, or 4 are not the lead jack. Of course, any jack may be assigned as the default lead jack.

In the explanation below V1, V2, V3, and V4 refer to the valve positions of jacks 1, 2, 3, and 4, respectively. The valve position determines the amount of hydraulic flow to the jack and controls how fast the jack extends or retracts. For example, the jack may extend at a faster rate the more an associated hydraulic valve is opened. The valve position also indicates how much the jack displacement speed can be increased. For example, the displacement speed of a jack cannot be increased if its valve is fully opened.

The logic described below may apply to any other type of device used for controlling a jack, such as the amount of current or voltage used by a controller to control how fast a motor extends or retracts a jack. Other inputs can also be used to determine current and available jack displacement speeds. For example, the control system may detect a paddle position on remote control device 359 or may compare a current displacement speed with a known maximum displacement speed.

P1, P2, P3, and P4 refer to the current displacements or positions of jacks 1, 2, 3, and 4, respectively. As described above, displacement sensors 313, 323, 333, and 343 may identify the displacement values of jacks 1, 2, 3, and 4, respectively.

In operation 419, jack 1 is initialized as the lead jack. For example, computer system 350 may assign a lead position tag to jack 1. In operation 421, the computer system checks if the valve position of jack 2 is greater than or equal to the valve position of jack 1. In operation 423, computer 350 checks if the valve position of jack 2 is greater than or equal to the valve position of jack 3. In operation 424, computer 350 checks if the valve position of jack 2 is greater than or equal to the valve position of jack 4.

In operation 425, the computer system checks if the displacement of jack 2 is less than the displacement of jack 1. In operation 427, computer 350 checks if the displacement of jack 2 is less than the displacement of jack 3. In operation 428, computer 350 checks if the displacement of jack 2 is less than the displacement of jack 4. Operations 425-428 determine if jack 2 is lagging behind the other jacks.

Operation 429 reassigns jack 2 as the lead jack if operations 421 through 428 are all true. In other words, jack 2 is assigned to the lead position when jack 2 has a larger or equal valve position than all other jacks and also lags behind the other jacks 1, 3, and 4. This indicates jack 2 is not only lagging behind the other jacks but also currently has less or equal ability to increase displacement speed relative to the other jacks.

Operations 431-439 are similar to operations 421-429 and determine if jack 3 should be reassigned to the lead position. For example, jack 3 is reassigned to the lead position when jack 3 has a larger or equal valve position than jacks 1, 2, and 4 and is also lagging behind jacks 1, 2, and 4.

Operations 441-449 are also similar to operation 421-429 and are performed by computer 350 to determine if jack 4 is reassigned to the lead position. For example, jack 4 is reassigned to the lead position when jack 4 has a larger or equal valve position than jacks 1, 2, and 3 and also has less displacement than jacks 1, 2, and 3.

Item 455 identifies the lead jack and may include both information, such as an index number (e.g. jack 1, 2, 3, or 4), position, and valve position. The computer system may repeatedly compare the displacements and valve positions of the different jacks. New lead jacks are repeatedly reassigned whenever a different jack starts lagging behind the other jacks while also having a largest or equally largest valve position.

Figure 6:
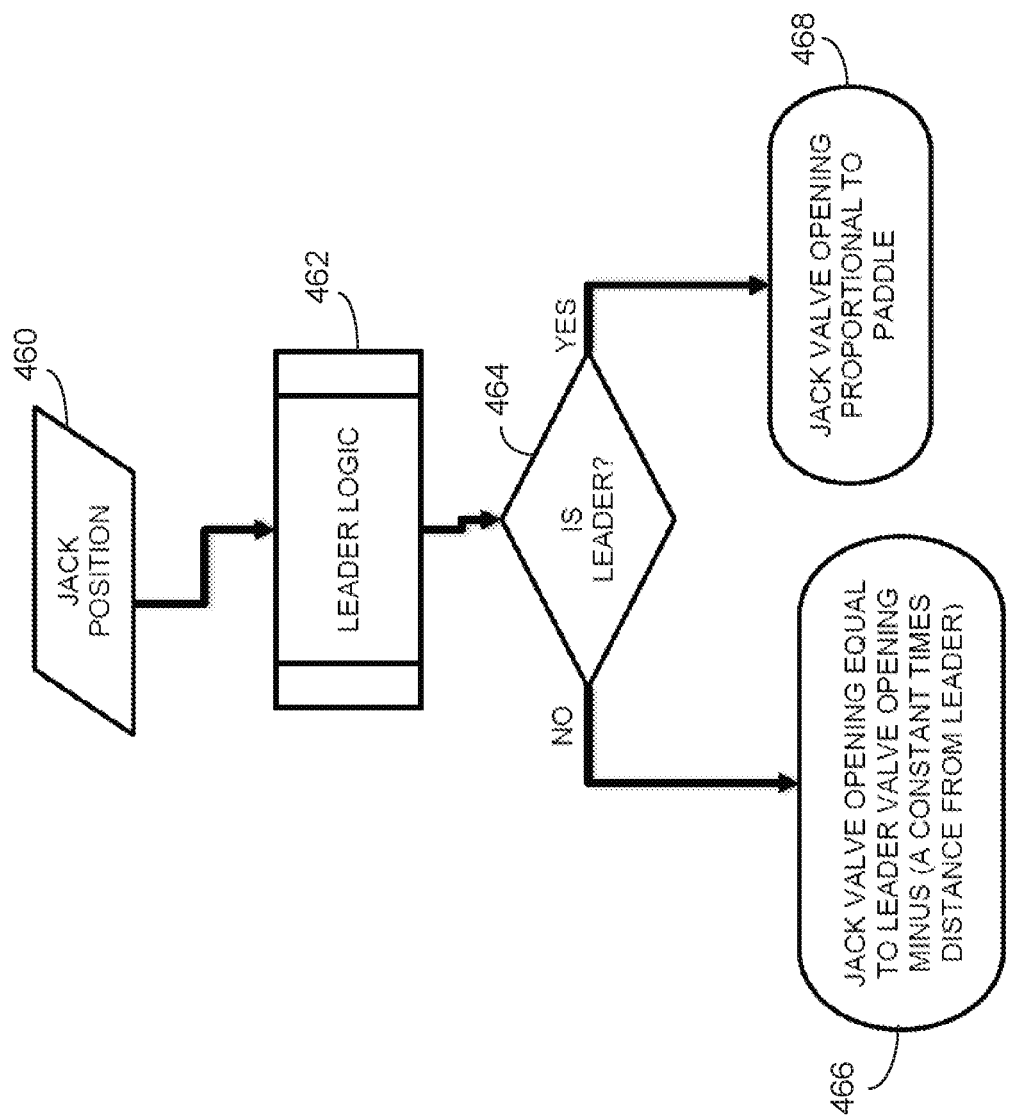
FIG. 6 show a process for controlling displacement speeds relative to the furthest back jack.

FIG. 6 shows an example of how the control system may control a single jack valve position based on the lead jack identified in FIG. 5. In operation 460, the control system may identify the position of a single jack. In operation 462, the control system uses the leader logic described in FIG. 5 to identify one of the jacks as the lead jack.

If the jack controlled by the logic described in FIG. 6 is identified as the lead jack in operation 464, the control system in operation 468 opens the jack valve proportionally to the paddle position. For example, the operator may move paddle 361 on remote control device 359 in FIG. 3 to a middle forward position. The control system may open the valve for the lead jack to a half open position. If the operator moves paddle 361 to a full ahead position, the control system may open the valve to a full open position.

If the jack is not the lead in operation 464, the control system in operation 466 adjusts the valve position based on a how far ahead the jack is from the leader. For example, the control system may adjust the valve position to equal the leader valve position minus the distance, or relative distance, the jack is ahead of the leader times a constant. In other words, the control system may reduce jack speeds below the lead jack speed proportionally to how far the jacks are ahead of the lead jack.

FIG. 7 is a flow chart illustrating in more detail how the control system adjusts valve positions to synchronize jack positions. The control system may initially start extending all of the jacks at a same displacement speed. For example, the control system may start extending or retracting all jacks at 70% of a maximum displacement speed. In another example, the control system may start extending or retracting the jacks at 100% of the maximum displacement speed or at some speed proportional to the remote control paddle position.

In operation 455, the control system identifies the lead jack as described above in FIG. 5. In operation 511, the control system identifies a first one of the other jacks "X" that is not designated as lead. In operation 514, the control system identifies the valve position of the lead jack. The control system in operation 515 identifies the displacement position of jack X and in operation 516 identifies the displacement position of the lead jack. The control system subtracts the lead jack displacement position from the jack X displacement position.

The control system in operation 517 multiplies the displacement difference by a constant. The control system then subtracts the result from the lead jack valve position identified in operation 514. The control system in operation 518 uses the result of operations 514-517 as a new valve position for jack X. The operations above are repeated for each non-leading jack.

The operations in FIG. 7 reduce the displacement speeds of the non-leading jacks proportionally to the difference in displacement positions relative to the lead jack. In other words, the control system reduces or throttles down the speeds of the non-leading jacks so the lead jack can catch up.

The operations in FIGS. 4-7 are continuously repeated at a selected sampling time period. If a new lead jack is identified during the next sampling period, the control system may increase the valve position of the new lead jack, if not already maximized. The control system then adjusts the valve positions of the other non-lead jacks based on how far ahead the jacks are from the new lead jack.

Figure 8:
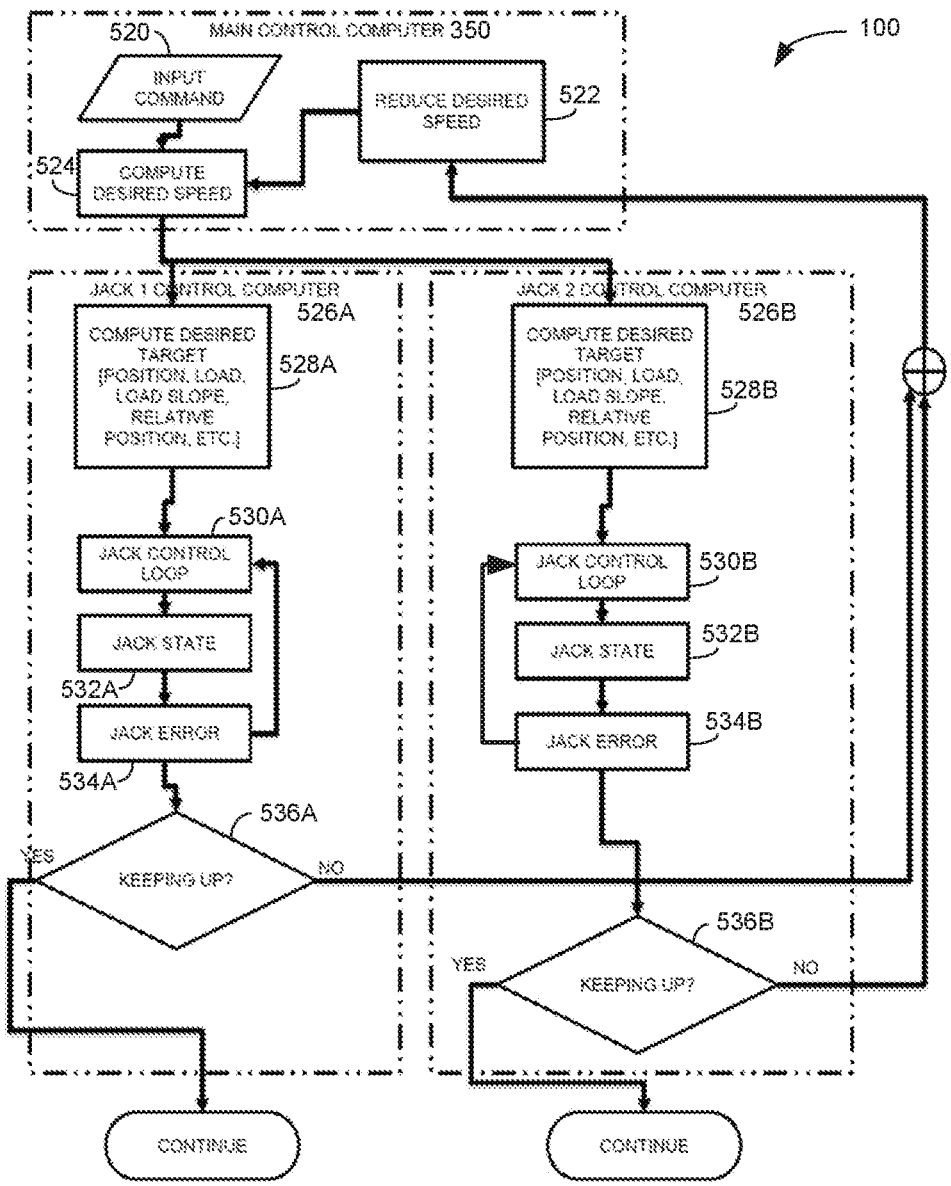
FIG. 8 shows a process for adjusting jack speeds based on their states relative to associated targets.

FIG. 8 shows another example of how the control system may control process speeds. In this example, the control system may use main control computer 350 and separate process control computers 526. For example, jack 1 may have an associated control computer 526A and jack 2 may have an associated control computer 526B. However, any of the operations performed in jack control computers 526 may alternatively be performed by main control computer 350.

In operation 520, computer 350 may receive an input command. For example, the operator may move a position of paddle 361 on remote control device 359 to start a stepping operation. In operation 524, computer 350 computes a desired process speed based on the input command. As explained above, the desired process speed may be based on how far the operator moves the paddle or may be based on a preconfigured value. In one example, a full ahead speed of the jacks may be one inch per second. The user may move the paddle to 50% of a full ahead position. Operation 524 may compute the desired process speed to be 0.5 inches per second. If the operator then moves the paddle to the full ahead position, operation 524 may re-compute the desired process speed to 1.0 inches per second. In another example, a maximum rate of change of load may be 10,000 lbs per second. The user may move the paddle to 50% of a full ahead position. Operation 524 may compute the desired process speed to be 5,000 lbs per second.

The desired process speed is sent to each of process control computers 526. In operations 528A and 528B, each process computer 526, or main control computer 350, computes a desired target at each sampling time based on the desired process speed. As explained above, the desired target may be an absolute position, a position relative to the other jacks, a load, a load slope, or any other selected parameter. In general, the desired target will change at each sampling time such that the position target at some time in the future corresponds to the amount of time to the sampling interval in question multiplied by the desired process speed. In one example, if the desired process speed were a jack extension rate of 3 inches per second and the current jack process value was an extension of 5 inches, the desired target 0.1 seconds in the future would be an extension of 5.3 inches and the desired target 0.2 seconds in the future would be an extension of 5.6 inches. In another example, if the desired process speed were a rate of change of jack load of 4,000 lbs per second and the current jack process value was a jack load of 7,000 lbs, the desired target 0.5 seconds in the future would be a jack load of 9,000 lbs and the desired target 1.2 seconds in the future would be a jack load of 13,800 lbs.

A control loop in operation 530 monitors the process state. Operation 532 identifies a current process state. For example, operation 532 may identify the current process position or the current process load slope. Operation 534 identifies an error between the current process state and the desired target computed in operation 528. The process error in operation 534 is fed back to process control loop operation 530. The process control loop may adjust operating parameters, such as the current jack speed or valve position, based on the error between the current process state and the desired process state. In one example, jacks are controlled using proportional integral derivative (PID) control devices to compute the desired targets and associated jack errors.

Operation 536 determines if the associated process is keeping up with the desired speed computed in operation 524. For example, if the process error identified in operation 534 is getting larger each sampling period, the process is not keeping up with the desired speed computed in operation 524. If operations 536 for all of the processes have substantially no process error or the process errors are getting smaller from previous measurements, main control computer 350 may maintain the current desired speed in operation 524. Control computer 350 in operation 524 also may start creeping up the desired speed when all processes are keeping up with the current desired speed.

If any of operations 536 indicates the associated process is not keeping up with the desired speed, control computer 350 may reduce the desired speed in operation 522. Process control computers 526 then may compute next desired targets and any associated process errors based on the reduced desired speed. If any of the processes are still not keeping up with the reduced desired speed, main control computer 350 may further reduce the desired speed until all processes are keeping up.

Figure 9:
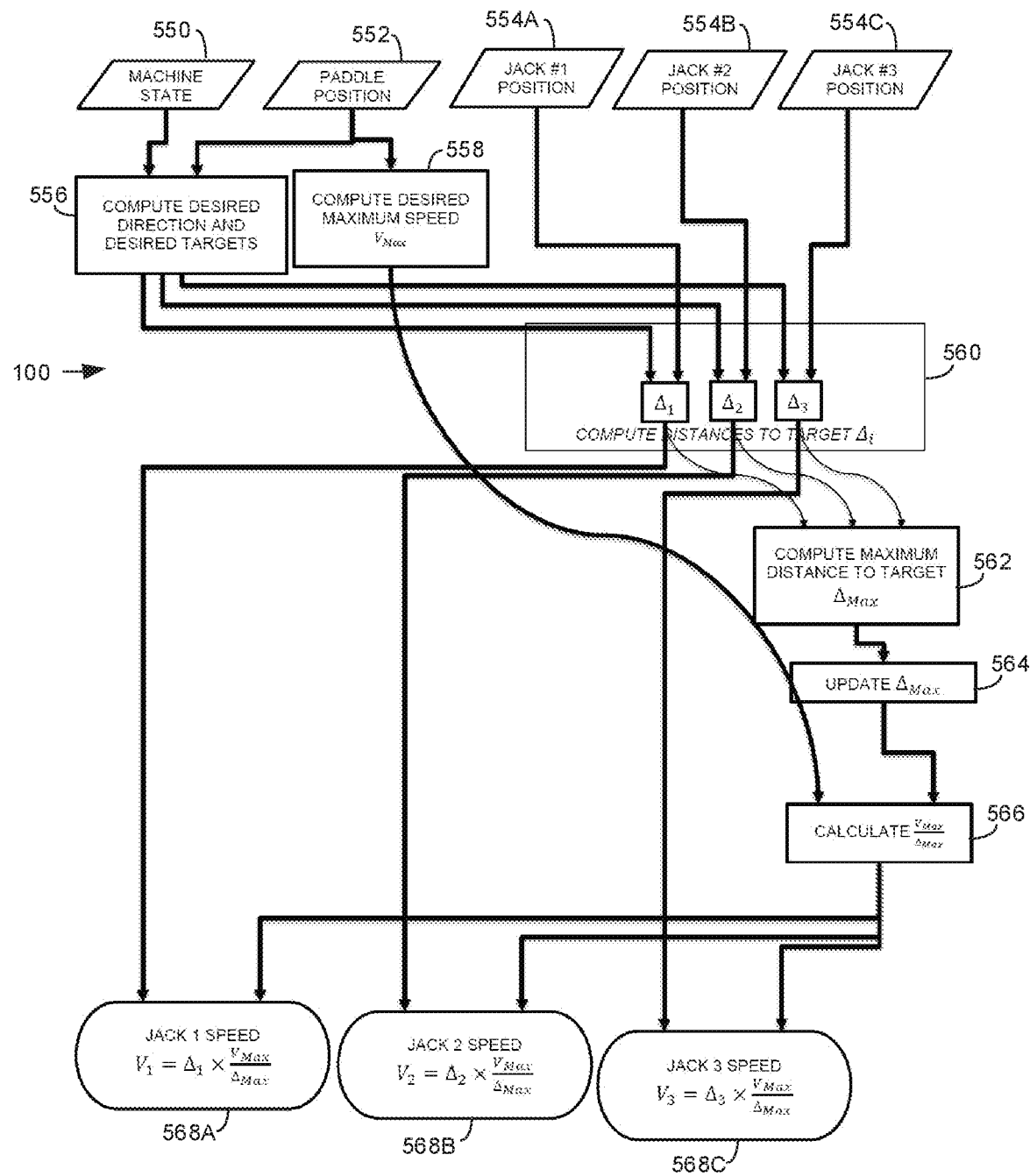
FIG. 9 shows a process for adjusting jack speeds based on distances from associated targets.

FIG. 9 shows another example of how the control system may vary jack speeds based on distances from desired targets. In operation 550, the control system may identify machine states of the walking machinery. For example, the jacks may be in retracted states, loaded states, or traveling states. In operation 552, the control system may detect a paddle position from the remote control device. In operations 554A-554C, the control system identifies the current positions of jacks 1, 2, and 3, respectfully.

In operation 556, the control system computes a desired jack direction based on the current machine state and the paddle position. For example, all the jacks currently may be retracted off the ground and the operator may move the control paddle into forward position. In the retracted machine state, the control system may start extending the jacks downward in response to the paddle position detected in operation 552.

As explained above, the control system in operation 556 also may compute desired targets for each of the jacks based on the machine state and paddle position. For example, in the retracted machine state and with a paddle position corresponding to jack extension, first desired targets for the jacks may be the extension values corresponding with the initiation of the loading phase. The computed targets may be the next "checkpoint" in the lifting process. For example, if the jacks are retracted and need to be extended, the next target may be the feet just touching the ground. If the jacks then need to be loaded, the next target may be the "loaded" state corresponding to a load slope ratio value. If the jacks need to be unloaded, the target may be the support feet just lifting off the ground. If the support feet are clear of the ground and the paddle further retracts the support feet, the target may be a fully retracted state.

In operation 558, the control system also computes a desired maximum speed $V_{Max}$ based on the paddle position. As explained above, the desired maximum speed may be based on how far the paddle is moved toward a full ahead position.

Operations 560 compute distances $\Delta_1$, $\Delta_2$, $\Delta_3$ of jacks 1, 2, and 3, respectively from their associated targets. For example, if the desired targets are the next intermediate positions toward the base surface, computed distances $\Delta_1$, $\Delta_2$, $\Delta_3$ in operation 560 may be the distance of the current jack positions from the next intermediate positions.

In operation 562, the control system identifies a maximum one of the distances $\Delta_1$, $\Delta_2$, $\Delta_3$ to the target ($\Delta_{Max}$). For example, distance $\Delta_2$ for jack 2 may currently be the furthest from the next associated target. In operation 564, the control system may update maximum distance $\Delta_{max}$. For example, the jack furthest back from the next associated target may change from the last sampling period. In operation 566, the control system may calculate a ratio between the desired maximum speed computed in operation 558 and the maximum distance identified in operation 562 ($V_{Max}/\Delta_{Max}$).

In operations 568A, 568C, and 568C, the control system calculates new desired speeds $V_1$, $V_2$, and $V_3$, for jacks 1, 2, and 3, respectively. The control system may calculate the new speeds by multiplying ratio $V_{Max}/\Delta_{Max}$ by the distance $\Delta_x$ of the associated jack from the next associated target. Maximum distance $\Delta_{Max}$ scales the desired maximum speed in operation 558 for all of the jacks other than the furthest behind jack. For example, jack 2 may be farthest behind the next associated target ($\Delta_2 = \Delta_{Max}$). The new speed calculated for jack 2 in operation 568B is $V_2 = V_{Max}$.

The control system in FIG. 9 causes jacks to more efficiently and quickly arrive at their associated targets. For example, less hydraulic fluid (less speed) is directed to jacks closer to their associated targets and more hydraulic fluid (more speed) is directed to jacks further away from their associate targets. Additionally, the control system in FIG. 9 causes all jacks to arrive at their respective targets substantially simultaneously with each jack moving at a substantially constant speed.

Figure 10:
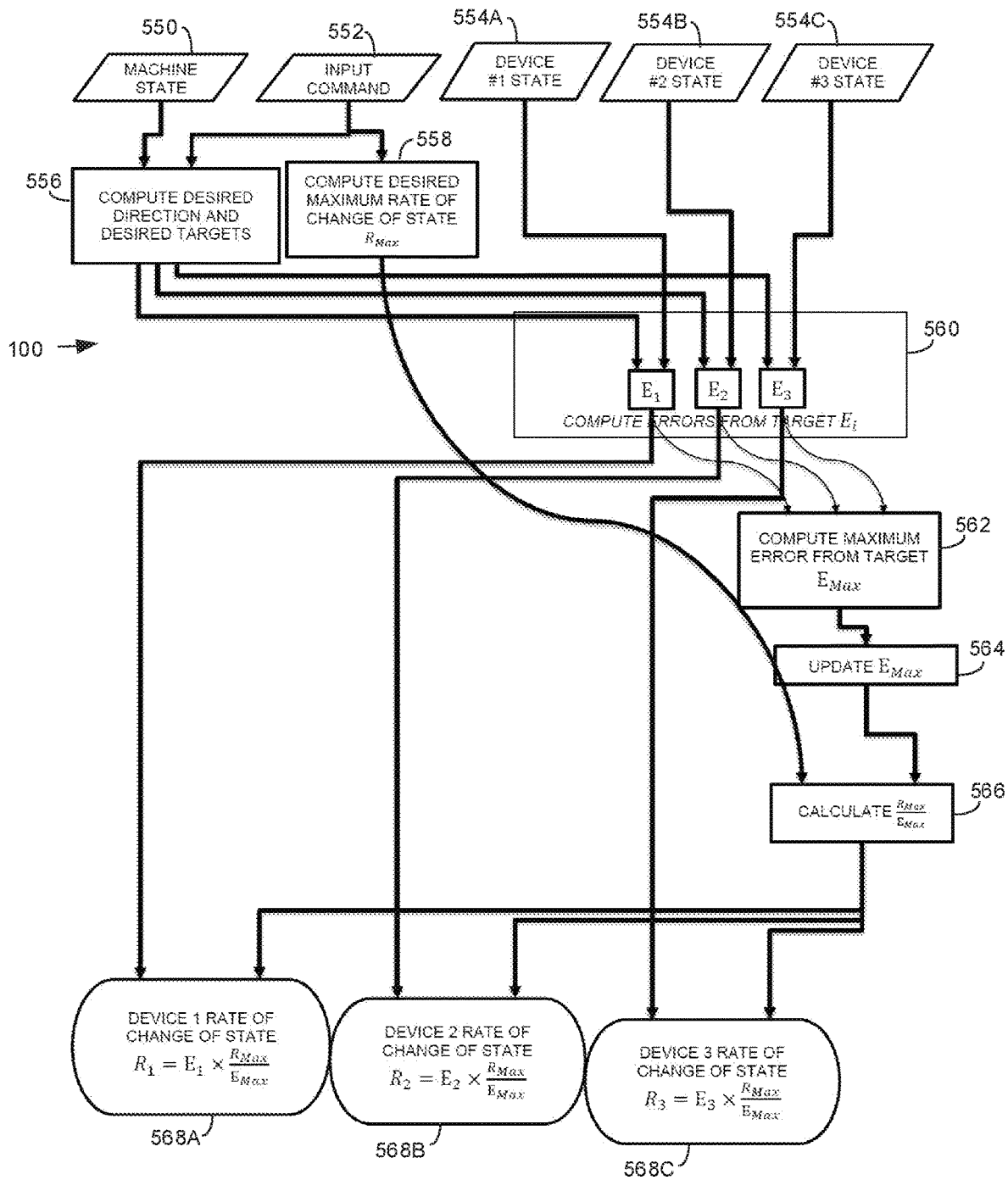
FIG. 10 shows a process for changing other jack states based on distances of the states from associated targets.

FIG. 10 shows how the control system may control devices for any associated state. Any current state of the devices are identified in operations 554A, 554B, and 554C.

As explained above, the state of the devices may include a position, load, setting, etc. Any targets can be computed in operation 556 for each of the devices based on the current machine state identified in operation 550 and the input commands received in operation 552. A maximum rate of change for the device state ($R_{Max}$) may be computed in operation 558 based on the input command. For example, the control system may compute how fast jacks are loaded prior to raising the load bearing frame off of the base surface. Error values ($E_1$, $E_2$ and $E_3$) are computed in operation 560 for devices 1, 2, and 3, respectively from the associated targets. For example, the control system may compute differences between desired loaded values and current loaded values. A maximum one of the errors ($E_{Max}$) may be identified in operation 562 and a ratio $R_{Max}/E_{Max}$ computed in operation 566. The control system calculates rate of change of states $R_1$, $R_2$, and $R_3$ for devices 1, 2, and 3, respectively, by multiplying the associated error values $E_1$, $E_2$ and $E_3$ by ratio $R_{Max}/E_{Max}$. The control system then may adjust the speed setting for devices 1, 2, and 3, based on the associated rate of change $R_1$, $R_2$, and $R_3$, respectively.

Figure 11:
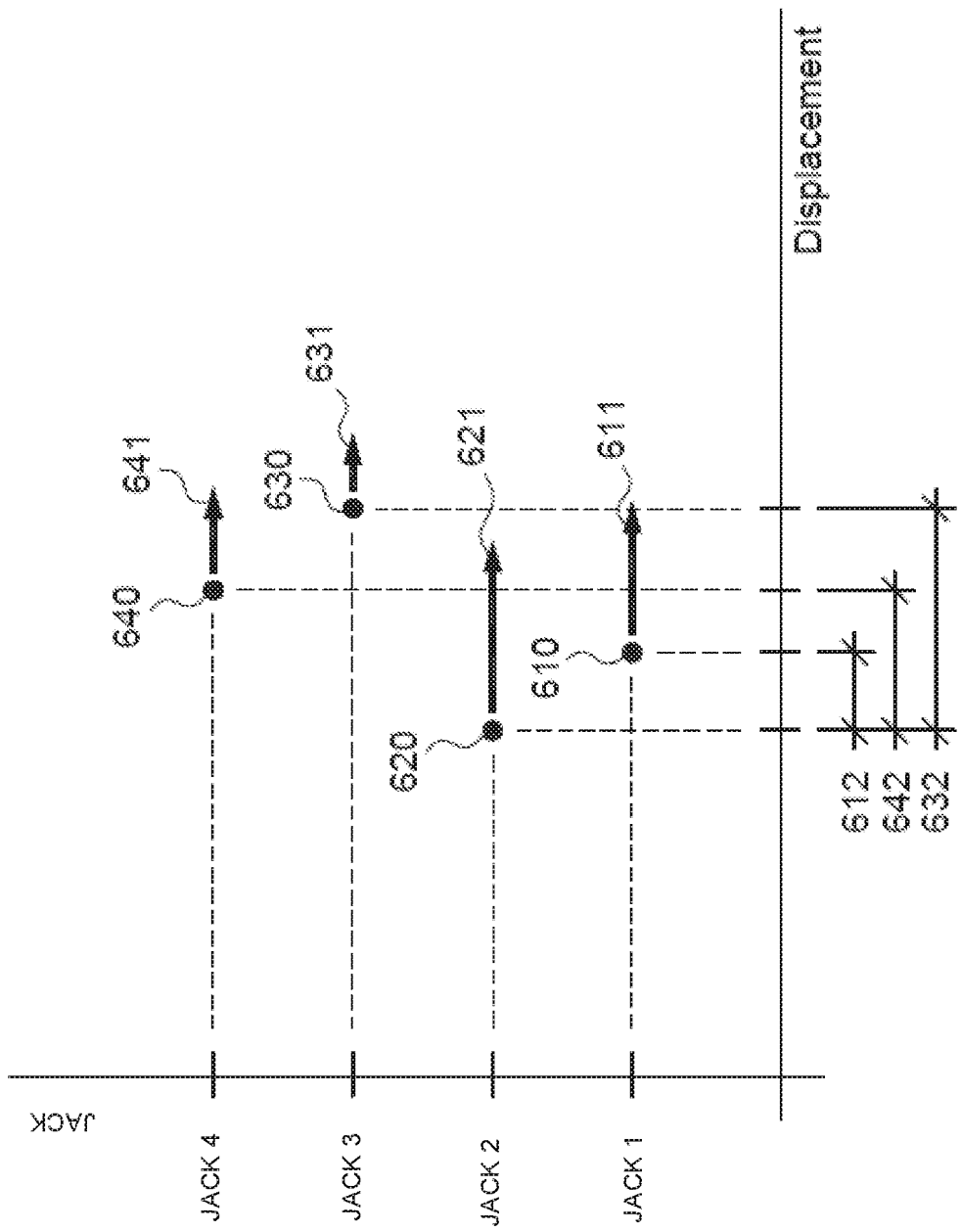
FIG. 11 shows an example of how jacks are displaced relative to a furthest back jack.

FIG. 11 shows a jack vs displacement graph for the plurality of jacks that may lift the load. Arrows 611, 621, 631, and 641 show how the control system controls the direction and magnitude of valve positions to more quickly and evenly displace multiple jacks.

Point 610 represents the current displacement of jack 1 and arrow 611 represents an amount the hydraulic valve for jack 1 is opened. Again, the hydraulic valve position represented by arrow 611 is associated with a desired speed of jack 1 and/or a percentage or proportion of a maximum jack displacement speed.

Point 620 represents the current displacement of jack 2 and arrow 621 represents an amount the hydraulic valve for jack 2 is opened. Point 630 represents the current displacement of jack 3 and arrow 631 represents an amount the hydraulic valve for jack 3 is opened. Point 640 represents the current displacement of jack 4 and arrow 641 represents an amount the hydraulic valve for jack 4 is opened.

Distance 612 represents the displacement difference between jack 1 and jack 2. Distance 642 represents the displacement difference between jack 4 and jack 2. Distance 632 represents the displacement difference between jack 3 and jack 2.

Since jack 2 currently has the smallest displacement, the valve position of jack 2 is increased the most. The valve position of jack 3 is reduced the most since jack 3 currently has the largest displacement relative to jack 2. The valve positions of jacks 1 and 4 are also reduced proportionally based on the associated amount of displacement relative to jack 2.

The control system may increase the valve/throttle position of lead jack 2 to 100% or may change the valve/throttle position to some other value that the other jacks cannot exceed. In another example, the control system may initially maximize the valve/throttle position of all jacks, then start reducing the valve/throttle positions of the non-leading jacks to allow the lead jack to catch up.

Figure 12:
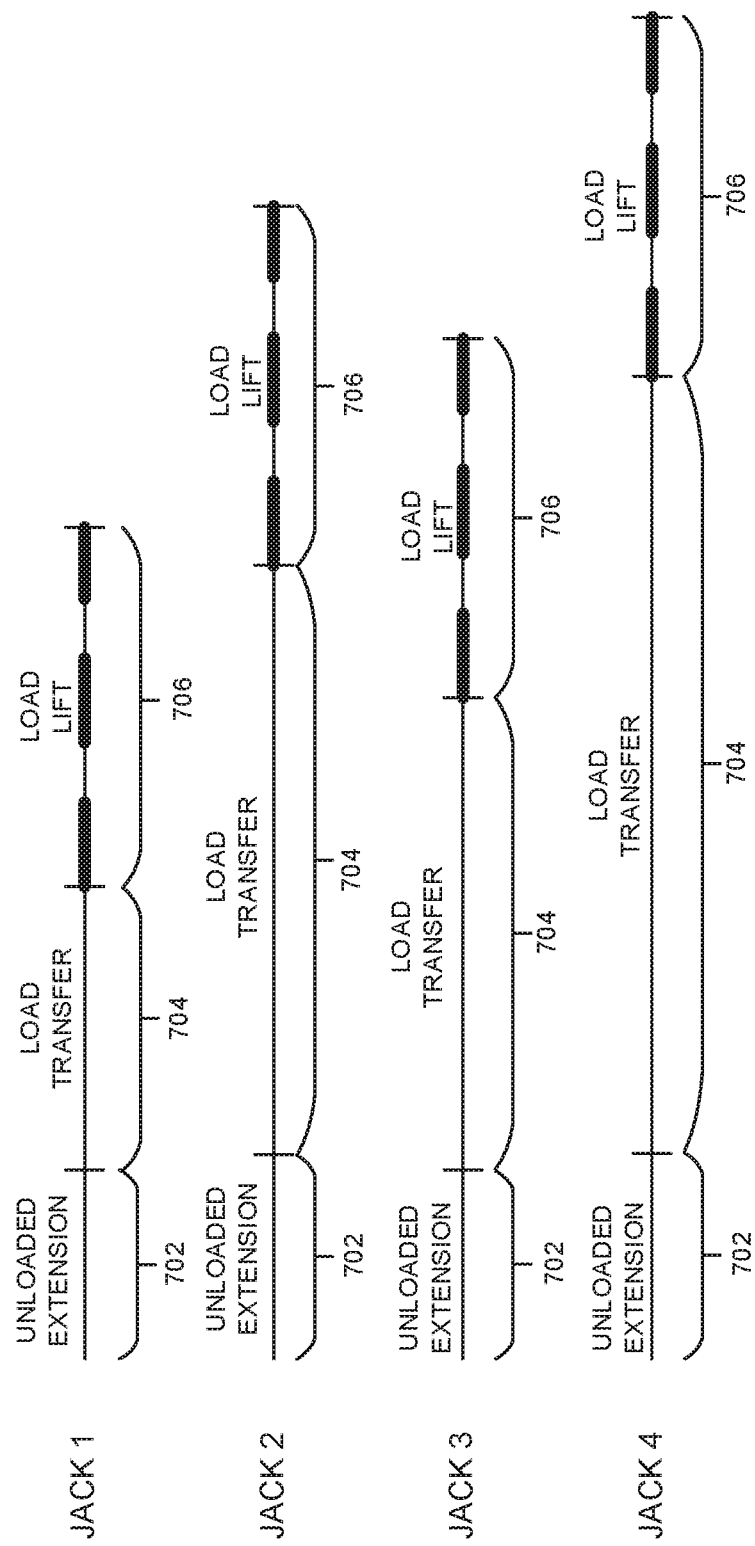
FIG. 12 shows how jacks are controlled during different walking stages.

FIG. 12 shows in more detail the three jack stages described above. During a first unload stage 702, jacks are initially in raised positions and are lowered down onto the base surface as shown above in FIGS. 1B and 1C. During unloaded extension stage 702, the control system may extend jacks 1-4 any of the ways described above in FIGS. 4-11.

During a second load transfer stage 704, the control system further extends jacks 1-4 into the base surface transferring the load from load bearing frame 118 to support feet 116 (FIGS. 1A-1F). One process for transferring the load onto support feet 116 is described in U.S. patent application Ser. No. 15/807,176, entitled: LIFTING LOAD WITH LIFTING DEVICES filed Nov. 8, 2017, which is incorporated by reference in its entirety.

For example, computer 350 and displacement sensors 10 in FIGS. 1A-1F are used by control system 100 to sense the weight of load 110 being transferred to individual jacks 117. Computer 350 determines when each jack 117 is in a loaded state by comparing a current load slope to a maximum load slope.

Computer 350 may calculate the current load slope by dividing a change in load by a change in jack displacement. Computer 350 then may compare the current load slope to the maximum load slope. If the current load slope is greater than the max load slope, computer 350 may assign the current load slope as the maximum load slope. If the current load slope is less than the maximum load slope, computer 350 calculates a load slope ratio by dividing the current load slope by the maximum load slope.

Computer 350 compares the load slope ratio to a load slope threshold. If the load slope ratio is less than the load slope threshold, computer 350 may determine jack 117 is in a loaded state and stop extending jack 117.

All jacks 117 are extended independently until they reach the loaded state. Computer 350 then moves into load lifting phase 706 and uniformly extend all jacks 117 by the same amount. In load lifting state 706, load bearing frame 118 is lifted evenly above base surface 105.

The cylinders in each jack 1-4 may be extended at a different distance after load transfer stage 704. To maintain the lift cylinders in the same relative positions while continuing to lift the load evenly up off of the base surface, computer 350 may monitor the amount of displacement of each jack relative to their fully loaded positions at the end of load transfer stage 704. Computer 350 then assigns the lead to the jack with the smallest amount of displacement relative to the start of load lifting stage 706 and that also has the largest or equally largest valve position. As explained above, the displacement speeds of the other jacks may be proportionally reduced based on the difference in displacement with the lead device.

Computer 350 also may use similar operations as described above for retracting jacks 1-4. For example, jacks 1-4 may lower load bearing frame 118 back onto base surface 105 and raise support feet 116 off of base surface 105 after completion of a step operation as shown in FIG. 1F.

While load bearing frame 110 is still raised off of the ground, computer 350 may retract jacks 1-4 all at substantially the same speed. The jack with a least amount of displacement and an equal to or greater than valve retraction position may be assigned lead jack. Computer 350 may reduce the retraction speeds of the other jacks allowing the lead jack to catch up to the other jacks.

Jacks 1-4 are all retracted by substantially the same amount until load bearing frame 118 is placed back on base surface 105. At this point, jacks 1-4 may have different displacement values. Computer 350 may identify one of jacks with a largest percentage of displacement behind the other jacks as the lead jack. The lead jack may be retracted at a highest valve setting. All other jacks may be retracted at reduced valve setting proportional to the displacement difference with the lead jack.

The operations described above allow the control system to more accurately, quickly, and evenly lift multiple points of a load and reduce stopped periods during lifting operations. The control system may automatically compensate for variable operating conditions preventing an operator from having to repeatedly and manually retune the jacks. By reducing the valve positions of the non-leading jacks, the hydraulic system supplies more hydraulic fluid to the lead jack so all jacks reach their final targets in less time.

Computer System

Control system 100 device may include any collection of devices or circuitry that individually or jointly execute a set (or multiple sets) of instructions to perform any one or more of the operations discussed above. The computing device may be part of an integrated control system or system manager, or may be provided as a portable electronic device configured to interface with a networked system either locally or remotely via wireless transmission.

The control system and microcomputer described above may include or communicate with a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

Computing devices used by the control system may include any collection of devices or circuitry that individually or jointly execute a set (or multiple sets) of instructions to perform any one or more of the operations discussed above. The computing device may be part of an integrated control system or system manager, or may be provided as a portable electronic device configured to interface with a networked system either locally or remotely via wireless transmission.

Processors used in the control system may comprise a central processing unit (CPU), a graphics processing unit (GPU), programmable logic devices, dedicated processor systems, micro controllers, or microprocessors that may perform some or all of the operations described above. The processors may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

The processors may execute instructions or "code" stored in any one of memories. The memories may store data as well. Instructions and data can also be transmitted or received over a network via a network interface device utilizing any one of a number of well-known transfer protocols.

Memories may be integrated together with the processing device, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing devices used in the control system can further include a video display, such as a liquid crystal display (LCD) or a cathode ray tube (CRT) and a user interface, such as a keyboard, mouse, touch screen, etc. All of the components of the computing device may be connected together via a bus and/or network.

The control system described above can use dedicated processor systems, micro controllers, programmable logic devices, or microprocessors that perform some or all of the operations. Some of the operations described above may be implemented in software, such as computer readable instructions contained on a storage media, or the same or other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

References above have been made in detail to preferred embodiment. Examples of the preferred embodiments were illustrated in the referenced drawings. While preferred embodiments where described, it should be understood that this is not intended to limit the invention to one preferred embodiment. To the contrary, it is intended to cover alternatives, modifications, and equivalents as may be included within the spirit and scope of the invention as defined by the appended claims.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:
1. A method of controlling multiple lifting or traveling devices, comprising:
monitoring states of the devices to identify one of the devices in a furthest back state at a time;

computing differences between the state of the identified one of the devices and the states of one or more of the other devices;
adjusting speeds of the devices based on the differences; and
after adjusting the speeds of the devices, performing a set of operations one or more times until a target end state is reached, wherein the set of operations includes:
identify one of the devices in a furthest back state at a next time;
computing differences between the state of the identified one of the devices in the furthest back state at the next time and states of one or more other devices at the next time; and
re-adjusting the speeds of the devices based on the differences between the state of the identified one of the devices in the furthest back state at the next time and the states of the one or more other devices at the next time.

2. The method of claim 1, wherein the one of the devices in the furthest back state at the time is a different device than the one of the devices in the furthest back state at the next time.

3. The method of claim 1, wherein the adjusting the speeds of the devices based on the differences includes computing new speed values for the devices to synchronize:
the states of the devices;
positions of the devices; or
loading states of the devices.

4. The method of claim 3, including reducing hydraulic fluid flow to the other devices based on the new speed values to increase the hydraulic fluid flow to the one of the devices in the furthest back state at the time.

5. The method of claim 3, including:
subtracting a current speed for the one of the devices in the furthest back state at the time from the new speed values for each of the other devices to generate new speed setpoints for the other devices; and
adjusting the speeds of the other devices based on the new speed setpoints.

6. The method of claim 3, including dividing the differences between the state of the one of the devices in the furthest back state at the time and the states of one or more of the other devices by a synchronization time to calculate the new speed values for the devices.

7. The method of claim 1, wherein:
the states of the devices include at least one of positions relative to associated position targets, positions relative to the other devices, load slope values relative to associated load slope targets, load slope values relative to the other devices, load values relative to associated load targets, or load values relative to associated processes.

8. The method of claim 1, wherein:
the speeds of the devices vary during a first stage while support feet attached to the devices move from a retracted state suspended above a base surface to an extended state onto the base surface;
the speeds of the devices vary during a second stage while the support feet change from an unloaded state to a loaded state; and
the speeds of the devices vary during a third stage while the support feet lift a load off of the base surface.

9. The method of claim 1, wherein the differences between the state of the identified one of the devices in the furthest back state at the time and the states of the one or more of the other devices comprise state differences, and wherein the method further comprises:
computing valve position differences between a valve position of the identified one of the devices in the furthest back state at the time and valve positions of the one or more of the other devices; and
adjusting the speeds of the devices based on the state differences and the valve position differences.

10. A method of controlling multiple lifting or traveling devices, comprising:
identifying states of the devices;
detecting extended positions of the devices;
identifying a first one of the devices in a furthest back state at a time, including identifying one of the devices with one of the extended positions less than or equal to the extended positions of the other devices as the first one of the devices in the furthest back state at the time;
computing state differences between the state of the first one of the devices and the states of one or more of the other devices;
computing valve position differences between a valve position of the first one of the devices and valve positions of the one or more of the other devices;
computing new speed values for the devices based on the state differences and the valve position differences; and
adjusting speeds of the devices based on the new speed values.

11. The method of claim 10, including:
adjusting the valve position for the first one of the devices proportionally to a speed value associated with an input command; and
adjusting the valve positions of the other devices based on distances of the extended positions of the other devices from the extended position of the first one of the devices.

12. The method of claim 10, including:
periodically detecting new extended positions for the devices; and
identifying a new first one of the devices with a furthest back state based on the new extended positions, wherein the new extended position for the new first one of the devices is less than or equal to the new extended positions of the other devices.

13. The method of claim 10, including reducing the valve positions of the other devices based on differences between the extended position for the first one of the devices and the extended positions for the other devices.

14. The method of claim 13, including:
multiplying the differences between the extended position for the first one of the devices and the extended positions for the other devices by a constant to generate scaled values; and
adjusting the speeds of the other devices based on the generated scaled values.

15. The method of claim 10, including reducing hydraulic fluid flow to the other devices based on the new speed values to increase the hydraulic fluid flow to the first one of the devices.

16. A method for controlling multiple devices used for moving a load, comprising:
identifying current states of the devices;
identifying one of the devices with a furthest back one of the current states as a lead device;
identifying differences between the current state of the lead device and the current states of the other devices;
reducing speeds of the other devices based on the differences;

computing synchronization speeds for the devices based on the differences between the lead device and the other devices;

deriving new speed setpoints for the devices by subtracting the synchronization speeds from a speed of the lead device; and adjusting the speeds of the devices based on the new speed setpoints.

17. The method of claim 16, including setting the speed of the lead device based on a user command.

* * * * *